(12) United States Patent
Zhu et al.

(10) Patent No.: US 9,305,091 B2
(45) Date of Patent: *Apr. 5, 2016

(54) ANCHOR TAG INDEXING IN A WEB CRAWLER SYSTEM

(75) Inventors: Huican Zhu, San Jose, CA (US); Jeffrey Dean, Menlo Park, CA (US); Sanjay Ghemawat, Mountain View, CA (US); Bwolen Po-Jen Yang, Sunnyvale, CA (US); Anurag Acharya, Campbell, CA (US)

(73) Assignee: Google Inc., Mountain View, CA (US)

( * ) Notice: Subject to any disclaimer, the term of this patent is extended or adjusted under 35 U.S.C. 154(b) by 369 days.

This patent is subject to a terminal disclaimer.

(21) Appl. No.: 13/300,516

(22) Filed: Nov. 18, 2011

(65) Prior Publication Data
US 2012/0066576 A1 Mar. 15, 2012

Related U.S. Application Data

(60) Continuation of application No. 11/936,421, filed on Nov. 7, 2007, now Pat. No. 8,484,548, which is a division of application No. 10/614,113, filed on Jul. 3, 2003, now Pat. No. 7,308,643.

(51) Int. Cl.
*G06F 17/00* (2006.01)
*G06F 17/30* (2006.01)
*G06F 17/27* (2006.01)
*G06F 17/22* (2006.01)

(52) U.S. Cl.
CPC ...... *G06F 17/30864* (2013.01); *G06F 17/2235* (2013.01); *G06F 17/2705* (2013.01); *G06F 17/30014* (2013.01)

(58) Field of Classification Search
CPC .......... G06F 17/2705; G06F 17/30864; G06F 17/30014; G06F 17/2235
USPC .......................... 715/205–206, 234, 733, 808
See application file for complete search history.

(56) References Cited

U.S. PATENT DOCUMENTS

| | | | |
|---|---|---|---|
| 5,634,062 A | 5/1997 | Shimizu et al. | |
| 5,801,702 A | 9/1998 | Dolan et al. | |
| 6,163,778 A | 12/2000 | Fogg et al. | |
| 6,189,019 B1 | 2/2001 | Blumer et al. | |
| 6,233,571 B1 | 5/2001 | Egger et al. | |
| 6,243,091 B1 | 6/2001 | Berstis | |
| 6,285,999 B1 | 9/2001 | Page | |
| 6,336,123 B2 | 1/2002 | Inoue et al. | |
| 6,404,446 B1 | 6/2002 | Bates et al. | |
| 6,418,433 B1 * | 7/2002 | Chakrabarti et al. | |
| 7,266,762 B1 * | 9/2007 | Chakrabarti ........ | G06F 17/3089 707/999.001 |

(Continued)

OTHER PUBLICATIONS

Cho, Junghoo, "Crawling the Web: Discovery and Maintenance of Large-Scale Web Data", PhD Thesis, Dept. of Computer Science, Stanford University, © 2001, 188 pages.*

(Continued)

*Primary Examiner* — William Bashore
*Assistant Examiner* — David Faber

(57) ABSTRACT

Provided is a method and system for indexing documents in a collection of linked documents. A link log, including one or more pairings of source documents and target documents is accessed. A sorted anchor map, containing one or more target document to source document pairings, is generated. The pairings in the sorted anchor map are ordered based on target document identifiers.

26 Claims, 13 Drawing Sheets

(56) References Cited

U.S. PATENT DOCUMENTS

| | | | |
|---|---|---|---|
| 2002/0078014 A1 | 6/2002 | Pallmann | |
| 2002/0078035 A1 | 6/2002 | Frank et al. | |
| 2002/0138509 A1* | 9/2002 | Burrows et al. | 707/501.1 |
| 2002/0169770 A1* | 11/2002 | Kim | G06F 17/3071 |
| 2005/0165778 A1 | 7/2005 | Obata et al. | |

OTHER PUBLICATIONS

Kennedy et al, "HTML & XHTML: The Definitive Guide, 5th Edition", O'Reilly, Aug. 2002, pp. 1-652.*

Brin, S., et al., "The Anatomy of a Large-Scale Hypertextual Web Search Engine," Proceedings of the 7th Int'l World Wide Web Conf., 1998, 28 pages.

Haveliwala, T., et al., "Topic-Sensitive PageRank," WWW2002, May 7-11, 2002, 10 pages.

Jeh, G., et al., "Scaling Personalized Web Search," Proceedings of the 11th Int'l World Wide Web Con., 2003, 26 pages.

Kamvar, S.D., et al., "Exploiting the Block Structure of the Web for Computing PageRank," Stanford Univ. Technical Report, 2003, 13 pages.

Koman, R., "How the Wayback Machine Works," XML.com, Jan. 21, 2002, 6 pages.

Notess, G., "The Wayback Machine: The Web's Archive," Online, vol. 26, No. 2, Mar./Apr. 2002, 4 pages.

Brusilovsky, Adaptive hypermedia: mapbased horizontal navigation in educational hypertext, Jun. 11, 2002, 10 pgs.

* cited by examiner

ANCHOR TAG INDEXING IN A WEB CRAWLER SYSTEM

RELATED APPLICATIONS

This application is a continuation of U.S. application Ser. No. 11/936,421, filed Nov. 7, 2007, now U.S. Pat. No. 8,484, 548, entitled "Anchor Tag Indexing in a Web Crawler System," which is a divisional of U.S. application Ser. No. 10/614,113, filed Jul. 3, 2003, now U.S. Pat. No. 7,308,643, entitled "Anchor Tag Indexing in a Web Crawler System," which is incorporated herein by reference in its entirety.

FIELD OF THE INVENTION

The present invention relates to the field of crawler systems for crawling a collection of linked documents, such as hyperlinked documents stored on servers coupled to the Internet or in an intranet, and in particular the present invention relates to a method and apparatus for indexing anchor tags and other information from documents other than the indexed document that contains a link to the indexed document.

BACKGROUND OF THE INVENTION

Search engines provide a powerful source of indexed documents from the Internet that can be rapidly scanned. However, as the number of documents in the Internet grows, it takes ever longer time periods between the time when a page is crawled by a robot and the time that it can be indexed and made available to a search engine. Furthermore, it takes ever longer time periods to replace or update a page once it has been indexed. Therefore, what is needed in the art are systems and methods for crawling and indexing web pages to reduce the latency between the time when a web page is either posted or updated on the Internet and the time when a representation of the new or updated web page is indexed and made available to a search engine.

In addition to problems associated with the latency between the time the content of a web page changes and the time that content can be indexed, the growth of the number of documents on the Internet poses additional challenges to the development of an effective search engine system. When a user submits a query to a search engine system, he expects a short list of highly relevant web pages to be returned. Previous search engine systems, when indexing a web page, associate only the contents of the web page itself with the web page. However, in a collection of linked documents, such as resides on the Internet, valuable information about a particular web page may be found outside the contents of the web page itself. For example, so-called "hyperlinks" that point to a web page often contain valuable information about a web page. The information in or neighboring a hyperlink pointing to a web page can be especially useful when the web page contains little or no textual information itself. Thus, what is needed in the art are methods and systems of indexing information about a document, the information residing on other documents in a collection of linked documents, so as to produce an index that can return a list of the most highly relevant documents in response to a user-submitted query.

SUMMARY OF THE INVENTION

The present invention addresses the problems alluded to above by enabling information from other documents in a collection of linked documents to be included in the part of an index that corresponds to a particular document. Some embodiments associate a subset of the text on a first web page containing a link to a second web page with an index entry corresponding to the second web page. This is advantageous where the first web page contains a more accurate description of the second web page than the text of the second web page itself. Additionally, some types of web pages (e.g., image files, video files, programs, and so on) contain little or no textual information that can be indexed by a text-based index. For these types of pages, textual information on pages linking to the page may be the only source of textual information about the page. Further advantages of this approach include the ability to index a web page before the web page has been crawled. Currently, the collection of web pages residing on the Internet include pages whose content changes rapidly, pages that are unpublished and republished frequently, and multimedia pages that may have little or no textual content. The present invention, which facilitates indexing information about a document that is not contained in the document itself, enables more effective and efficient text-based indexing systems for web search engines.

Some embodiments provide a method of processing information related to documents in a collection of linked documents. First, a link log is accessed. The link log includes a plurality of link records. Each link record in turn includes a respective source document identifier corresponding to a respective source document address and a respective list of target document identifiers corresponding to respective target document addresses. A sorted anchor map is output. The sorted anchor map includes a plurality of anchor records. Each anchor record includes a respective target document identifier corresponding to a respective target document address and a respective list of source document identifiers corresponding to a respective list of source document addresses. The anchor records are ordered in the sorted anchor map based on their respective target document identifiers. In the collection of documents, a document located at the source document address, corresponding to an anchor record's source document identifier in the record's list of source document identifiers, contains at least one outbound link, the at least one outbound link pointing to a corresponding target document address. Additionally, the target document address corresponds to the respective target document identifier for the anchor record. In some embodiments, each anchor record in the sorted anchor map further comprises a respective list of annotations.

Some embodiments provide methods that include repeating the accessing and outputting so as to produce a layered set of sorted anchor maps. When a merge condition has been satisfied, a subset of the layered set of sorted anchor maps is merged, producing a merged anchor map. The merged anchor map includes a plurality of merged anchor map records, each merged anchor record corresponding to at least one anchor record from the subset of the layered set of sorted anchor maps, wherein the merged anchor records are ordered in the merged anchor map based on their respective target document identifiers.

Some embodiments further include outputting a sorted link map. The sorted link map includes a plurality of link map records. Each link map record includes a respective source document identifier and a respective list of target document identifiers. Some embodiments provide methods that further include repeating the accessing, outputting a sorted anchor map, and outputting a sorted link map so as to produce a layered set of sorted anchor maps and a layered set of sorted link maps. In some of these embodiments, when a merge condition has been satisfied, a subset of the layered set of sorted link maps is merged, producing a merged link map.

The merged link map includes a plurality of merged link map records. Each merged link record corresponds to at least one link record from the subset of the layered set of sorted link maps. The merged link records are ordered in the merged link map based on their respective source document identifiers.

Some embodiments provide a system for processing information about documents in a collection of linked documents. The system includes a link log and a global state manager configured to access the link log. The link log includes a plurality of link records. Each link record includes a respective source document identifier corresponding to a respective source document address and a respective list of target document identifiers corresponding to respective target document addresses. The global state manager is configured to output a sorted anchor map. The sorted anchor map includes a plurality of anchor records, each anchor record comprising a respective target document identifier and a respective list of source document identifiers. The plurality of anchor records are ordered in the sorted anchor map based, at least in part, on their respective target document identifiers. Furthermore, for at least one anchor record, a document located at the source document address corresponding to a source document identifier in the list of source document identifiers contains at least one outbound link. The at least one outbound link points to a corresponding target document address. The target document address corresponds to the respective target document identifier for the at least one anchor record.

Some embodiments further provide a page ranker. The page ranker determines a PageRank, or some other query-independent relevance metric, for a particular document based on the output of the global state manager.

Another aspect of the present invention provides a computer program product for use in conjunction with a computer system. The computer program product includes a computer readable storage medium and a computer program mechanism therein. The computer program mechanism includes:

a link log data structure, the link log comprising a plurality of link records, wherein each link record comprises a respective source document identifier corresponding to a respective source document address and a respective list of target document identifiers corresponding to respective target document addresses;

a global state manager module configured to access the link log; and a sorted anchor map data structure.

The global state manager module contains instructions for writing to the sorted anchor map data structure. The plurality of anchor records are ordered in the sorted anchor map data structure based, at least in part, on their respective target document identifiers. Furthermore, the collection of linked documents is arranged such that, for at least one anchor record, a document located at the source document address corresponds to a source document identifier in the list of source document identifiers contains at least one outbound link. The outbound link points to a corresponding target document address. The target document address corresponds to the respective target document identifier for the at least one anchor record. Some embodiments further include an indexer module. The indexer module includes instructions for building an index of the collection of documents based, at least in part, on the contents of the sorted anchor map data structure.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DETAILED DESCRIPTION OF EMBODIMENTS

Data Structure for Storing URLs.

Figure 1:
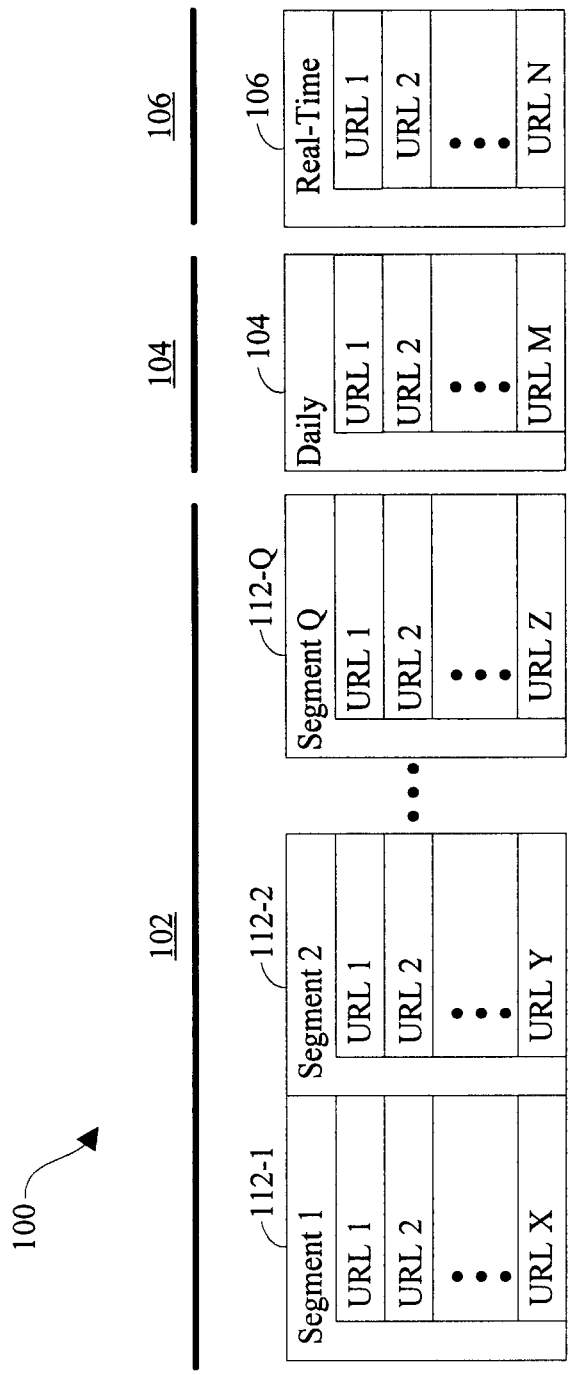
FIG. 1 illustrates a data structure for storing uniform resource locations (URLs).

Referring to FIG. 1, a three-layer data structure 100 is illustrated. Base layer 102 of data structure 100 comprises a sequence of segments 112. In one embodiment, each segment 112 comprises more than two hundred million uniform resource locations (URLs). Together, segments 112 represent a substantial percentage of the addressable URLs in the entire Internet.

Periodically (e.g., daily) one of the segments 112 is deployed for crawling purposes, as described in more detail below. In addition to segments 112, there exists a daily crawl layer 104. In one embodiment, daily crawl layer 104 comprises more than fifty million URLs. Daily crawl layer 104 comprises the URLs that are to be crawled more frequently than the URLs in segments 112. In addition, daily crawl layer 104 comprises high priority URLs that are discovered by system 200 during a current epoch.

In some embodiments, data structure 100 further comprises an optional real-time layer 106. In some embodiments, optional real-time layer 106 comprises more than five million URLs. The URLs in real-time layer 106 are those URLs that are to be crawled multiple times during a given epoch (e.g., multiple times per day). For example, in some embodiments, the URLs in optional real-time layer 106 are crawled every few minutes. Real-time layer 106 also comprises newly discovered URLs that have not been crawled but should be crawled as soon as possible.

Figure 2:
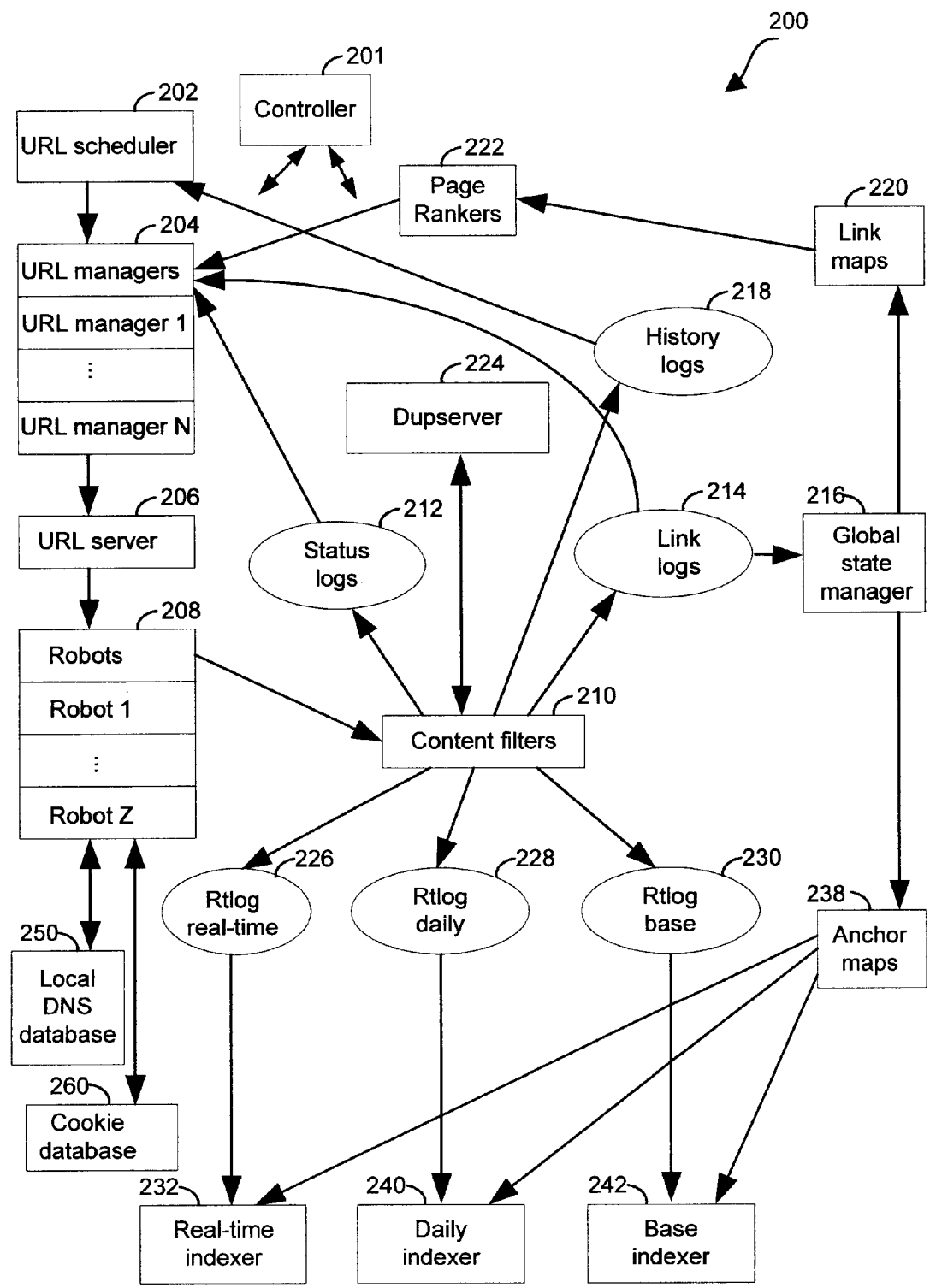
FIG. 2 illustrates a system for crawling web pages.

The URLs in layers 102, 104, and 106 are all crawled by the same robots 208 (FIG. 2). However, the results of the crawl are placed in indexes that correspond to layers 102, 104, and 106 as illustrated in FIG. 2 and described in more detail below. Layers 102, 104, and 106 are populated by a URL scheduler based on the historical (or expected) frequency of change of the content of the web pages at the URLs and a measure of URL importance, as described in more detail below.

URL Discovery.

There are a number of different sources for the URLs used to populate data structure 100. One source of URLs is the direct submission of URLs by users to the search engine system. Another source of URLs is through discovery of outgoing links on crawled pages. A third source of URLs is through submissions (e.g., time-based submissions) from third parties who have agreed to provide content. For example, such third parties can give links as they are published, updated, or changed.

Automated time-based submissions are made possible using technologies such as RDF Site Summary (RSS) and Resource Description Framework (RDF). RSS is a protocol, an application of XML, that provides an open method of syndicating and aggregating Web content. Using RSS files, a data feed can be created that supplies headlines, links, and article summaries from a Web site. RDF is a syntax for specifying metadata.

Before storage in data structure 100, a URL (and the content of the corresponding page) is processed by a series of modules that are designed to ensure content uniformity and to prevent the indexing of duplicate pages. For example, one such process is a URL rewrite module. The URL rewrite module strips or rewrites commands in URL statements that would produce undesirable output. For example, if a URL includes a statement that inhibits output of a certain column, the statement is stripped from the URL. In addition to examining the syntax of specific URLs, there is a host duplicate detection module. The host duplicate detection module attempts to determine which hosts are complete duplicates of each other by examining incoming URLs.

Exemplary Methods.

Figure 3A:
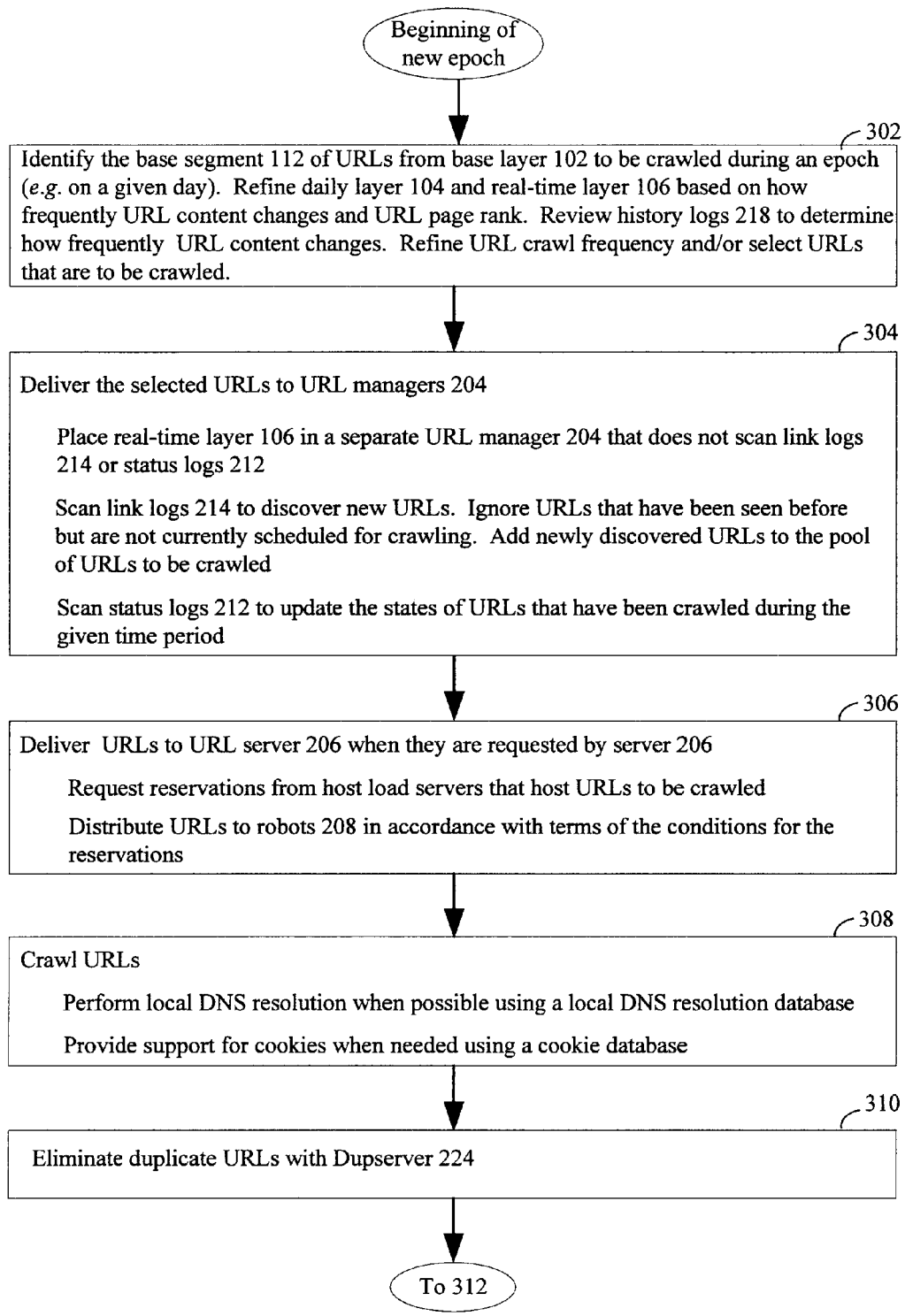
FIGS. 3A-3B illustrate a method of web crawling.
Figure 3B:
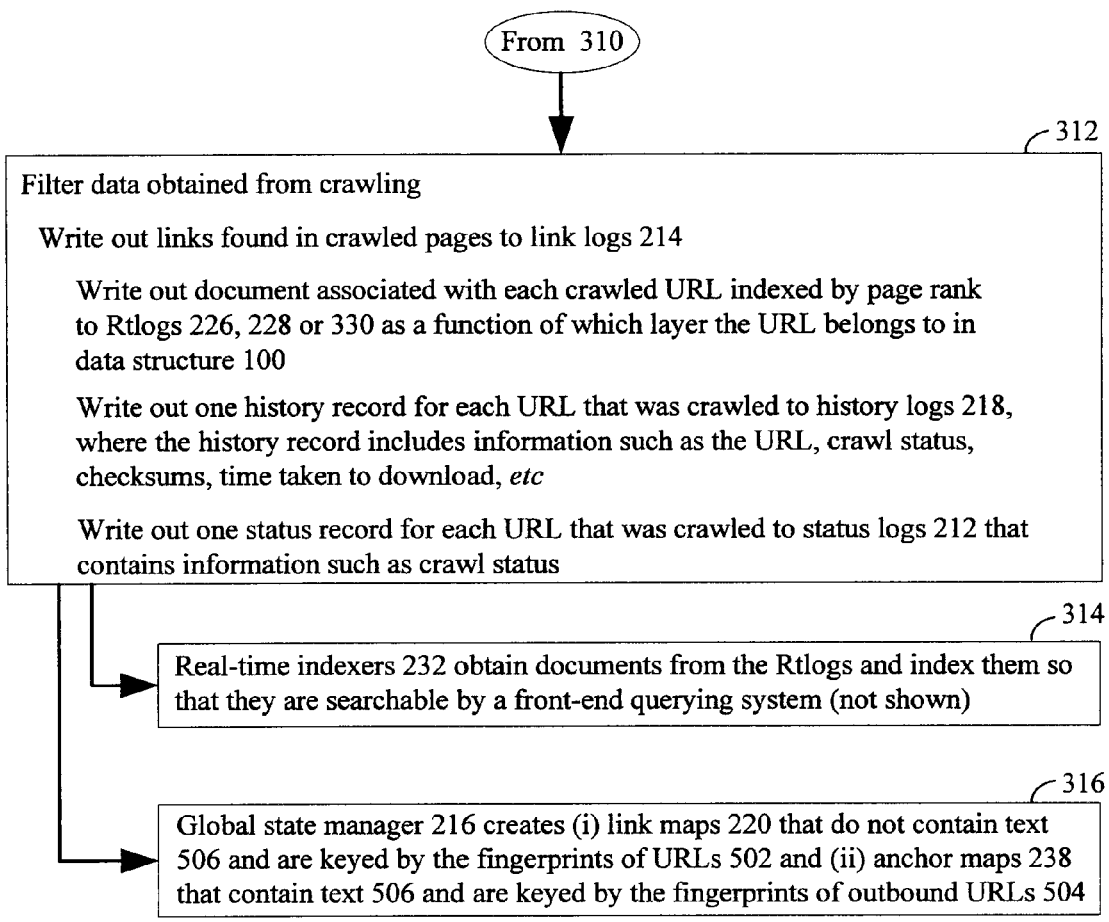

An exemplary system 200 and method by which the URLs in data structure 100 (FIG. 1) are crawled is respectively illustrated in FIGS. 2 and 3. The exemplary method illustrated in FIGS. 3A and 3B describes events that take place during a predetermined time period, termed an epoch. Each time an epoch elapses, a new epoch is initiated by re-executing steps 302 and 304 of the process illustrated in FIGS. 3A and 3B. An epoch can be set to any length of time. In one embodiment, an epoch is one day.

Step 302.

In step 302, URL scheduler 202 determines which URLs will be crawled in each epoch, and stores that information in data structure 100. Controller 201 selects a segment 112 from base layer 102 for crawling. The selected segment 112 is referred to herein as the "active segment." Typically, at the start of each epoch, controller 201 selects a different segment 112 from base layer 102 as the active segment so that, over the course of several epochs, all the segments 112 are selected for crawling in a round-robin style.

URL scheduler 202 revises daily layer 104 and optional real-time layer 106 by moving URLs to layers 104 and 106 from base layer 102 or vice versa. The decision as to whether to add or remove URLs from daily layer 104 and real-time layer 106 is based on information in history logs 218 that indicates how frequently the content associated with the URLs is changing as well as individual URL page ranks that are set by page rankers 222. In some embodiments, the determination as to what URLs are placed in layers 104 and 106, as opposed to layer 102, is made by computing a daily score of the form:

$$\text{daily score} = [\text{page rank}]^2 * \text{URL change frequency}$$

The mechanism by which URL scheduler 202 obtains URL change frequency data is best understood by reviewing FIG. 2. When a URL is accessed by a robot 208, the information is passed through content filters 210. Content filters 210, among other things, determine whether a URL has changed and when a URL was last accessed by a robot 208. This information is placed in history logs 218, which are passed back to URL scheduler 202. By reviewing the log records for a particular URL, each of which indicates whether the content of a URL changed since the immediately previous time the URL was crawled, the URL schedule 202 (or other module) can compute a URL change frequency. This technique is particularly useful for identifying URL's whose content (i.e., the content of the page at the URL) changes very infrequently, or perhaps not at all. Furthermore, the computation of a URL change frequency can include using supplemental information about the URL. For instance, the URL scheduler 202 may maintain or access information about web sites (i.e., URL's) whose content is known to change quickly.

A query-independent score (also called a document score) is computed for each URL by URL page rankers 222. Page rankers 222 compute a page rank for a given URL by considering not only the number of URLs that reference a given URL but also the page rank of such referencing URLs. Page rank data can be obtained from URL managers 204. A more complete explanation of the computation of page rank is found in U.S. Pat. No. 6,285,999, which is hereby incorporated by reference as background information.

URL history log 218 can contain URLs that are not found in data structure 100. For instance, the URL history log 218 may contain log records for URL's that no longer exist. The URL history log 218 may also contain log records for URL's that exist but that which the URL scheduler 202 will no longer schedule for crawling (e.g., due to a request by the website owner that the URL not be crawled, due to objectionable content, or for any other reasons).

In cases where URL scheduler 202 determines that a URL should be placed in a segment 112 of base layer 102, an effort is made to ensure that the placement of the URL into a given segment 112 of base layer 102 is random (or pseudo-random), so that the URLs to be crawled are evenly distributed (or approximately evenly distributed) over the segments. In some embodiments, the fingerprint of the URL is used to achieve the random selection of a segment 112 to place the URL. A fingerprint is, for example, a 64-bit number (or a value of some other predetermined bit length) that is generated from the corresponding URL by first normalizing the URL text (for example, converting host names to lower case) and then passing the normalized URL through a fingerprinting function that is similar to a hash function with the exception that the fingerprint function guarantees that the fingerprints are well distributed across the entire space of possible numbers. In some embodiments, the fingerprint modulus N, where N is the number of segments 112 in base layer 102 (e.g. "fingerprint modulus 12", in the case where there are 12 segments 112 in base layer 102) is used to select the segment 112 in which to place a given URL. In some embodiments, additional rules are used to partition URLs into a segment 112 of base layer 102, daily layer 104, and real-time layer 106.

In some embodiments, it is not possible to crawl all the URLs in an active segment 112, daily layer 104, and real-time layer 106 during a given epoch. In one embodiment, this problem is addressed using two different approaches. In the first approach, a crawl score is computed for each URL in active segment 112, daily layer 104, and real-time layer 106. Only those URLs that receive a high crawl score (e.g., above a threshold value) are passed on to the next stage (URL managers 204, FIG. 2). In the second approach, URL scheduler 202 refines an optimum crawl frequency for each such URL and passes the crawl frequency information on to URL managers 204. The crawl frequency information is then ultimately used by URL managers 204 to decide which URLs to crawl. These two approaches are not mutually exclusive and a combined methodology for prioritizing the URLs to crawl (based on both the crawl score and the optimum crawl frequency) may be used.

In embodiments where a crawl score is computed, URL scheduler 202 determines which URLs will be crawled on the Internet during the epoch by computing a crawl score for each URL. Those URLs that receive a high crawl score (e.g., above a predefined threshold) are passed on to the next stage (URL managers 204) whereas those URLs that receive a low crawl score (e.g., below the predefined threshold) are not passed on to the next stage during the given epoch. There are many different factors that can be used to compute a crawl score including the current location of the URL (active segment 112, daily segment 104 or real-time segment 106), URL page rank, and URL crawl history. URL crawl history is obtained from URL history logs 218. Although many possible crawl scores are possible, in one embodiment the crawl score is computed as:

$$\text{crawl score} = [\text{page rank}]^2 * (\text{change frequency}) * (\text{time since last crawl}).$$

Additionally, many modifications to the crawl score, including cutoffs and weights, are possible. For example, the crawl score of URLs that have not been crawled in a relatively long period of time can be upweighted so that the minimum refresh time for a URL is a predetermined period of time, such as two months.

In embodiments where crawl frequency is used, URL scheduler 202 sets and refines a URL crawl frequency for each URL in data structure 100. URL crawl frequency for a given URL represents the optimum crawl frequency (or, more generally, a selected or computed crawl frequency) for a URL. The crawl frequency for URLs in daily layer 104 and real-time layer 106 will tend to be shorter than the crawl frequency of URLs in base layer 102. Crawl frequency for any given URL can range from a minute or less to a time period that is on the order of months. In one embodiment, the optimal crawl frequency for a URL is computed based on the historical change frequency of the URL and the page rank of the URL.

In addition to other responsibilities, URL scheduler 202 determines which URLs are deleted from data structure 100 and therefore dropped from system 200. URLs are removed from data structure 100 to make room for new URLs that are to be added to data structure 100. In some embodiments, a "keep score" is computed for each URL in data structure 200. The URLs are then sorted by this "keep score" and URLs that receive a low "keep score" are eliminated as newly discovered URLs are added to data structure 100. In some embodiments, the "keep score" is the page rank of a URL that is determined by page rankers 222 (FIG. 2).

Step 304.

In step 304, URL managers 204 receive the active segment as well as layers 104 and 106 from URL scheduler 202. In typical embodiments, because of the computational demands imposed upon URL managers 204, each manager 204 is resident on its own dedicated server. Further, in some embodiments, real-time layer 106 is managed by a separate URL manager 204 that holds all or a substantial portion of layer 106 in high speed random access memory. The active segment and daily layers are partitioned into the remaining URL managers 204. Typically, this partitioning is performed using a modulo function or similar function on the fingerprint values (or a portion of a fingerprint value) derived from each URL in the active segment and daily layers so as to partition these URLs into a set of approximately equal sets (partitions). Each of these sets is assigned to a different URL manager 204 of a plurality of URL managers 204.

In some embodiments, data structure 100 is partitioned and stored in a plurality of servers. In such embodiments, this plurality of servers is represented by URL scheduler 202. URLs that are copied from the URL scheduler 202 servers are distributed to the servers hosting the URL managers 204 on a random basis. Further, the number of servers used by URL scheduler 202 and the number of servers that host URL managers 204 are constrained such that they are relatively primed. That is, there is no common divisor between (i) the number of servers used by URL scheduler 202 and (ii) the number of servers hosting URL managers 204. One example of a relatively primed topology is the case in which URL scheduler 202 is partitioned across 11 servers and there are 13 servers for the URL managers 204.

When the number of servers between two stages of system 200 (FIG. 2) is relatively primed, a modulo function can be used to randomly distribute URLs to servers in the next stage. For example, in one embodiment, the fingerprint of each URL that is be copied from URL scheduler 202 to URL manager 204 is obtained. Next, a modulus of the fingerprint (or the modulus of a portion of the fingerprint or of a function of the fingerprint) is taken. Specifically, the modulus that is taken of the fingerprint is the number of possible destination servers. Thus, in the example where URL scheduler 202 is partitioned across 11 servers and there are 13 servers for URL managers 204, then modulus 13 of the URL fingerprint of a respective URL is used to determine which of the 13 servers the respective URL will be sent.

As discussed above, in some embodiments, real-time layer 106 is managed by a separate URL manager 204 that holds all or a substantial portion of the real-time layer in high speed random access memory. Thus, in some embodiments, the (i) number of servers that host URLs other than those from real-time layer 106 and (ii) number of servers that host portions of data structure 100, other than real-time layer 106, are relatively primed (e.g., 11 and 13).

The use of constrained numbers of servers is used in various stages of system 200 (FIG. 2). For example, in some embodiments, the number of DupServers 224, global state managers 216, indexers 232, 240 and 242, and page rankers 222 is constrained so that they are hosted by relatively primed numbers of servers. Advantages of such a randomization scheme are at least two-fold. First, this scheme reduces the complexity of the computer code required to ensure random distribution of URLs across a plurality of servers at a given stage of system 200. Rather than relying on complex randomization schemes, all that is required is computation of the URL fingerprint (or a portion of the URL fingerprint) modulus the number of servers in the next stage. Second, the randomization itself ensures that, if a server fails at any stage of system 200, the data that is not processed due to the failure represents a randomized sample of the URLs in data structure 100, rather than a complete category of URLs. Such randomization, therefore, reduces the affect that individual server failure has on system 200. When a server fails, isolated URLs from across data structure 100 may not get indexed or updated during a given epoch. The impact of a server failure on users of the search engine is less noticeable when the impacted URLs are randomized than when whole categories of URLs are impacted (e.g., not indexed) by a failure of a server in system 200. Thus, the process illustrated in FIGS. 3A and 3B can progress even when a server at any given stage is working slower than other servers at the same stage or is, in fact, down altogether.

Figure 4:
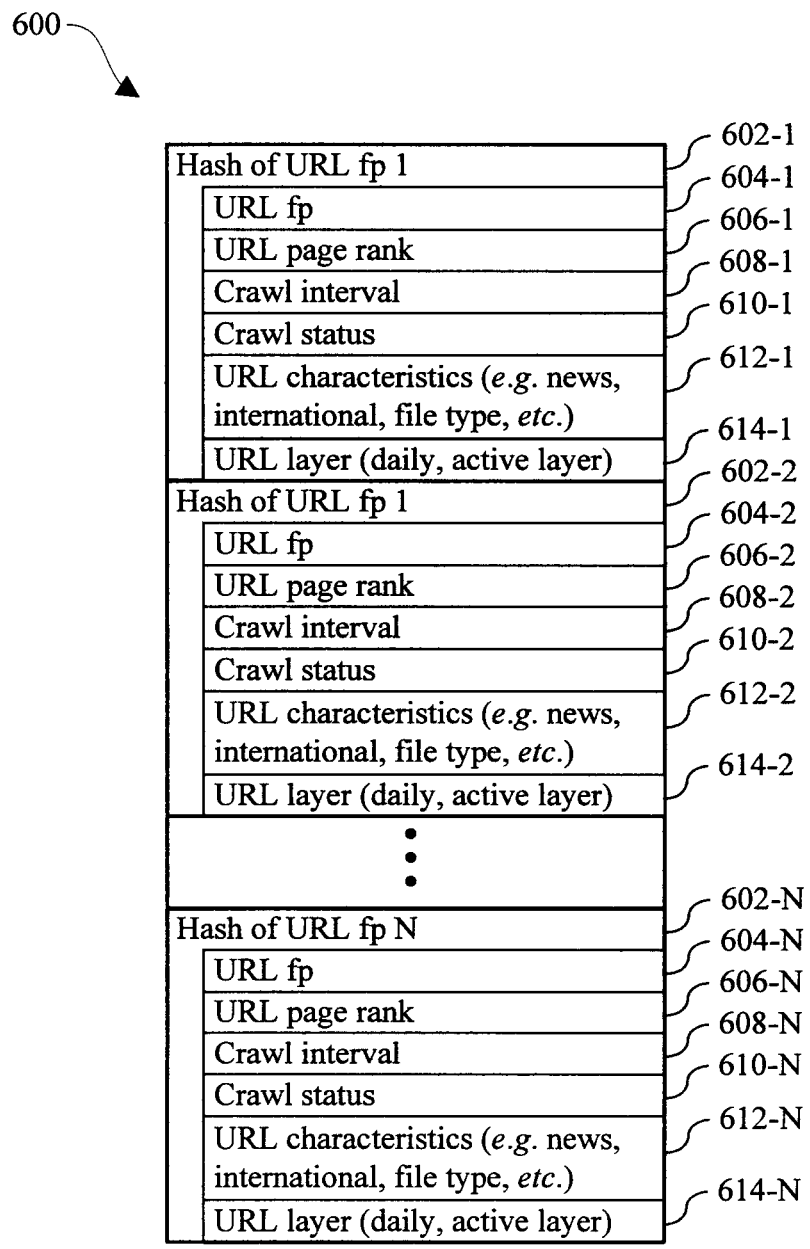
FIG. 4 illustrates a hash table for storing state information about URLs that are queued to be crawled.

In FIG. 4, state information for URLs is stored in a hash table 600. Each URL manager 204 stores information about the URLs that have been assigned to the URL manager in the hash table 600 (FIG. 4), which is stored in random access memory. The normalized hash 602 of the URL fingerprint 604 serves as the index to the table 600.

The storage of URLs in hash tables 600 on each server hosted by a URL manager 204 is advantageous because it provides a way of quickly accessing URL state information. For example, to obtain state information for a particular URL, all that is required is to look up the record having the hash value that corresponds to the hash of the URL. Such a lookup process is more efficient than searching through records of all the URLs held by all the URL managers 204 for a desired URL.

Representative URL state information stored in hash tables 600 includes the URL's fingerprint (called the URL fingerprint) 604, URL page rank 606, and the layer (102, 104, or 106) to which the URL belongs. In some embodiments, URL page rank 606 is not stored in hash table 600 but is stored in a data structure that is available to each URL manager 204. A wide range of additional URL state information can be stored in hash table, including information that is obtained from or derived from status logs, history logs, and page rankers. Representative state information that can be stored in hash tables 600 is described below.

Each of the URL managers 204, other than the URL manager 204 that hosts real-time layer 106, perform a variety of functions. For instance, they scan link logs 214 to discover new URLs. Link logs 214 comprise all the links that are found on scanned web pages during the current epoch. URLs that have been seen by system 200 before but have not been scheduled for crawl during the current epoch are ignored. Newly discovered URLs are added to a hash table 600 of a URL manager 204. The hash table data structure provides an advantageous mechanism for quickly determining whether a table 600 contains a URL discovered in a link log. Rather than scanning large lists of URLs to determine whether a URL in a link log is new, the URL from the link log is simply hashed and a search is made for the resultant hash value in each hash table 600. If a URL is found in a link log 214 and is not in any hash table 600, it is added to the hash table 600 of one of the URL managers 204.

Referring to FIG. 2, URL managers 204 scan status logs 212 in order to update the state of URLs that have been delivered to URL server 206 to be crawled. The URL server 206 distributes the URLs to be crawled among the robot crawlers 208. Status logs 212 are sequential logs that are generated by content filters 210. Content filters 210 receive content (i.e., retrieved documents) from the robot crawlers 208. Status logs 212 include the status of URLs that have been handed to URL server 206 by URL manager 204 during the current epoch. Status logs 212 indicate whether a URL was successfully crawled by a robot. If the status for a URL says "crawled" then a URL manager 204 knows that the URL has been crawled and work with the URL is finished until the crawl period for that URL has elapsed. Crawl status is stored in field 610 in the exemplary hash table 600 illustrated in FIG. 4. Likewise, if status log 212 returns a "HTTP 404" value, indicating that the URL does not exist, then the URL manager 204 knows that work with the URL is complete, at least until the next crawl period. Alternatively, if status log 212 does not include a record of the URL or indicates that that the URL was busy when the web crawler 208 (robot; FIG. 2) attempted to access the URL, than URL manager 204 reschedules the URL for crawling. Still further, if a status log 212 indicates that content filter 210 has deleted the URL, the URL manager 202 removes the URL from the respective hash table 600 and the URL is no longer crawled.

In some embodiments, the number of URLs hosted by URL managers 204 exceeds the number of URLs than can be crawled during a given epoch and/or there is a risk that URLs hosted by URL managers 204 will be crawled on an infrequent basis during a given epoch. In such embodiments, the URL status information maintained for URLs by URL managers 204 can be used to ensure that, to the extent possible, the URLs matching select criteria are given high priority for crawling. In other words, URL state information can be used to prioritize which URLs will be sent to URL server 206. Several different factors can be used to accomplish this prioritization, such as URL crawl interval 608 and URL page rank 606, to name a few. URL managers 204 obtain the page rank of URLs from page rankers 222. Page rankers 222 maintain a persistent record of the page rank of URLs and actively update the page rank of URLs using link maps 220 as described in more detail below. Crawl interval 608 represents a target frequency that a URL should be crawled. For example, if a URL has a crawl interval 608 of two hours, the URL manager will attempt to crawl the URL every two hours. Any number of criteria to be used to prioritize which URLs will be delivered upon request to URL server 206, including "URL characteristics" 612 such as the category of the URL. Representative URL categories include, but are not limited to news URLs, international URLs, language categories (e.g., French, German, Japanese, etc.), and file type categories (e.g., postscript, powerpoint, pdf, html). The URL characteristics 612 for a URL may identify a plurality of URL categories to which the URL belongs.

Step 306.

Periodically, URL server 206 makes requests from URL managers 204 for URLs. In response, URL managers 204 provide URL server 206 with URLs. In some embodiments, URL server 206 requests specific types of URLs from URL managers 204 based on a policy (e.g., eighty percent foreign URLs/twenty percent news URLs) that URL server 206 is enforcing. URL managers 204 are able to service such requests because of the URL state information they store for each URL in hash tables 600. Additionally, URL server 206 attempts to ensure that each URL manager 204 contributes URL requests.

URL server 206 distributes URLs from URL managers 204 to robots 208 to be crawled. Conceptually, a robot 208 is a program that automatically traverses the Web's hypertext structure by retrieving a document at a URL, and recursively retrieving all documents that are referenced by the retrieved document. The term "recursive" as used here is not limited to any specific traversal algorithm. However, in a system that retrieves and indexes billions of documents, this simple recursive methodology is not workable. Instead, each robot 208 crawls the documents assigned to it by the URL server 206. The robot passes retrieved documents to the content filters 210, which process the links in the downloaded pages, from which the URL scheduler 202 determines which pages are to be crawled. Robots 208 are unlike normal web browsers, such as Internet Explorer (Microsoft, Redmond Wash.). For instance, when a robot retrieves the document at a URL, it does not automatically retrieve content (e.g., images) embedded in the document through the use of object or other tags. Also, in one embodiment, the robots are configured to not follow "permanent redirects". Thus, when a robot encounters a URL that is permanently redirected to another URL, the robot does not automatically retrieve the document at the target address of the permanent redirect.

In some instances, URL server 206 avoids overloading any particular target server (not shown) that is accessed by the robots 208. The URL server 206 determines the maximum number of URL requests to be sent to any particular host. It does this by making a procedure call to a server called the host load server (not shown). The host load server stores information for each known host server (i.e., a server storing documents known to the search engine) indicating the maximum request load to be imposed by entire search engine on the host server number, and the portion of that load which is currently in use or reserved by robots. The URL server 206 sends a load reservation request to the host load server, requesting the right to send download requests to a specified host server, and receives back an indication of the number of download requests that the URL server can allocate to a robot. In other words, the URL server will be told how many URLs the URL server can send to a robot for downloading. Then, URL server 206 parcels out the proper number of URLs to robots in accordance with the load reservation granted to the URL server 206 by the host load server. The robots 208 take these URLs and download (or at least attempts to download) the documents at those URLs. When URL server 206 runs out of URLs to process, it requests more URLs from URL managers 204. Furthermore, when a robot completes the process of downloading the set of URLs it received from the URL server, the host load reservations made by the URL server are released. Alternately, host load reservations are made for a fixed period of time, and are automatically released upon the expiration of that fixed period of time.

Step 308.

In step 308, a plurality of robots 208 crawl URLs that are provided to the robots 208 by URL server 206. In some embodiments, robots 208 use a calling process that requires domain name system (DNS) resolution. DNS resolution is the process by which host names (URLs) are resolved into their Internet Protocol (IP) addresses using a database that provides a mapping between host names (URLs) and IP addresses. In some embodiments, enhancements to known DNS resolution schemes are provided in order to prevent DNS resolution from becoming a bottleneck to the web crawling process, in which hundreds of millions of URLs must be resolved in a matter of hours. One of these enhancements is the use of a dedicated local database 250 (FIG. 2) that stores the IP addresses for URLs that have been crawled by system 200 in the past, which reduces the system's reliance on DNS servers on the Internet. This allows URLs that have been previously crawled by system 200 to be pre-resolved with respect to DNS resolution. The use of a local DNS resolution database 250 enables a high percentage of the system's DNS resolution operations to be handled locally, at very high speed. Only those URLs that are not represented on local DNS database 250 (e.g., because they have not been previously crawled) are resolved using conventional DNS resources of the Internet. As a result, the IP addresses of URLs are readily accessible when they are needed by a robot 208. Also, the system presents a much lower load on the DNS servers that would otherwise be needed to perform DNS resolution on every URL to be crawled.

Robots 208 use various protocols to download pages associated with URLs (e.g., HTTP, HTTPS, gopher, File Transfer Protocol, etc.). Robots 208 do not follow permanent redirects that are found at URLs that they have been requested to crawl. Rather they send the source and target (i.e., redirect) URLs of the redirect to the content filters 210. Referring to FIG. 2, content filters 210 take the redirect URLs and place them in link logs 214 where they are passed back to URL managers 204. The URL managers 204, in turn, determine when and if such redirect URLs will be assigned to a robot 208 for crawling. Robots 208 do follow temporary redirects and obtain page information from the temporary redirects.

Step 310.

Pages obtained from URLs that have been crawled by robots 208 are delivered to the content filters 210. In typical embodiments, there is more than one content filter 210 in system 200 because of the computational demands of the content filter 210. In step 310, content filter 210 sends information about each retrieved page to DupServer 224 to determine if the document is a duplicate of other pages. In one embodiment, the information sent to the DupServer 224 about each page includes the URL fingerprint of the page, the content fingerprint of the page, the page's page rank, and an indicator as to whether the page is source for a temporary or permanent redirect. When a duplicate is found, the page rankings of the duplicate pages (at other URLs) are compared and the "canonical" page for the set of duplicate pages is identified. If the page presented to the DupServer 224 is not the canonical page (of the set of duplicate pages), the content filter 210 does not forward the page (to the respective RTlog 226, 228, 230) for indexing. Rather, the content filter 210 makes an entry for the page in the history log 218, creates or updates an entry for the URL in the status log 212, and then ceases work on the page. In effect, a non-canonical page is deleted from the search engine, except for the entries in the history log and status log. In addition to identifying duplicate web pages, DupServer 224 assists in the handling of both temporary and permanent redirects encountered by the robots 208.

Examples of stages where the number of servers used to host the stage is constrained have been described. For, example, the number of servers used to host data structure 100 is constrained relative to the number of servers used to host URL managers 204 such that they are relatively primed. However, there are examples in system 200 in which the number of servers used to host a stage is not constrained such that it is relatively primed with respect to the number of servers used to host a prior or subsequent stage. The number of servers used to host content filters 210 represents one such example. In other words, the number of servers used to host content filters 210 is not constrained such that it is relatively primed with respect to the number of robots 208. In fact, in some embodiments, the number of servers used to host content filters 210 is a multiple of the number of servers used to host robots 208.

Step 312. In the embodiment illustrated in FIGS. 2 and 3A-3B, the content filters write out four types of log files, link logs 214, RTlogs (226, 228, or 230), history logs 218, and status logs 212. With the exception of those URLs that have been flagged as not being canonical pages (i.e., not suitable for indexing) by the DupServer 224, URLs that have been crawled by robots 208 are processed as described below. For those URLs that have been flagged as not suitable for indexing, content filter 210 will insert corresponding records in all RTlogs, the appropriate link log 214, and the history logs 218.

Figure 5:
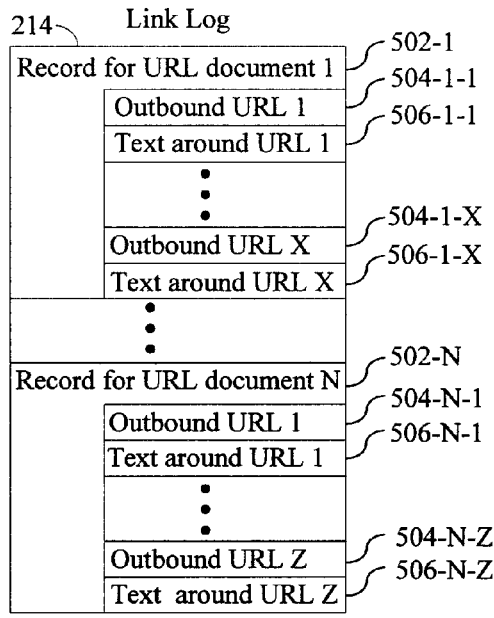
FIGS. 5A-5D respectively illustrate data structures for a link log, an Rtlog, a history log, and a status log.
Figure 5:
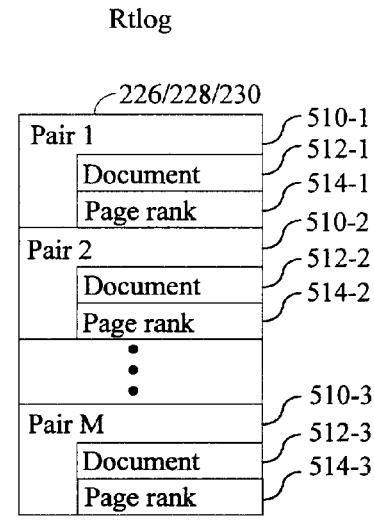
Figure 5:
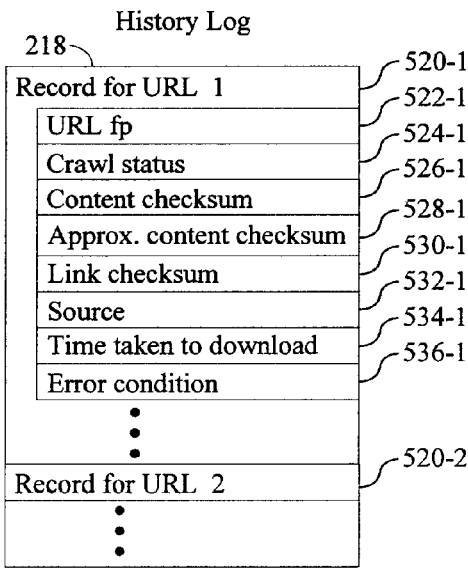
Figure 5:
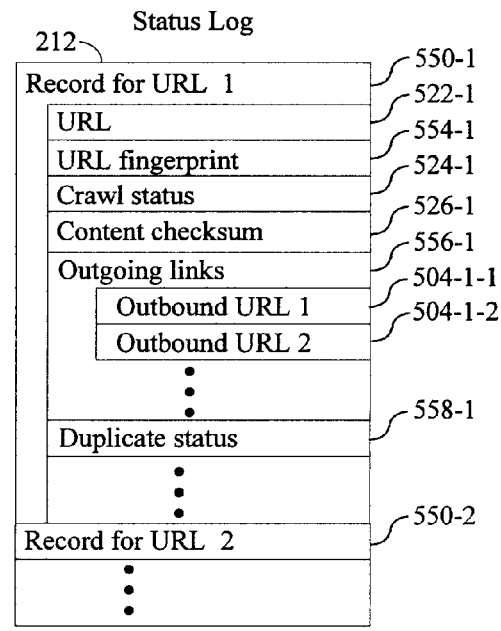

Referring to FIG. 5A, a link log 214 contains one link record 502 per URL document. A URL document is a document obtained from a URL by a robot 208 and passed to content filter 210. Each record 502 lists the URL fingerprints 504 of all the links (URLs) that are found in the URL document associated with a record 502 as well as the text 506 that surrounds the link. For example, text 506 can state "to see a picture of Mount Everest click here", where the page identified by the link represents an image of Mount Everest. In one embodiment, link log 214 is partitioned or segmented across multiple servers, typically using a modulo function or similar function on a fingerprint value (or a portion of a fingerprint value) associated with the URL so as to partition records 502 across a plurality of servers so that content filter 210 can append to the link logs 214 at a very high bandwidth.

Referring to FIG. 5B, an RTlog stores the documents 512 obtained by robots 208. Each document 512 is coupled with the page rank 514 that was assigned to the source URL of the document to form a pair 510. In other words, if a document 512 is obtained from URL "XYZ", then the document is paired with the page rank 514 assigned to the URL "XYZ" and this pair 510 is stored in an RTlog. As illustrated in FIG. 2, there are three RTlogs, one for each layer in data structure 100. That is, there is an RTlog base 230 for the active segment 112 of base layer 102, an RTlog daily 228 for daily layer 104, and an RTlog real-time 226 for real-time layer 106. As in the case of link log 214, each RTlog is partitioned or segmented, typically using a modulo function or similar function on a fingerprint value (or a portion of a fingerprint value) associated with the source URL of each document 514 so as to partition pairs 510 across a plurality of servers so that data can be written to and read from the RTlogs at a very high bandwidth. Although not shown, in some embodiments, the RTlog includes the document URL or URL fingerprint.

Referring to FIG. 5C, a history log 218 comprises a record 520 for each URL 522 that has been crawled by a robot 208. As illustrated in FIG. 5C, there are a wide range of possible fields that can be included in each record 520. One field is crawl status 524. Crawl status 524 indicates whether the corresponding URL 522 has been successfully crawled. Other field is the content checksum 526, also known as the content fingerprint. When pages have identical content, they will also have the same content fingerprint 526. URL scheduler 202 can compare these content fingerprint with a previous content fingerprint obtained for the corresponding URL (identified by URL fingerprint 522 in the history log record 520) on a previous crawl to ascertain whether the web page has changed since the last crawl. Similarly, URL scheduler 202 can use link checksum 530 to determine whether any of the outbound links on the web page associated with the corresponding URL 522 have changed since the last crawl. Source 532 provides an indication of whether robot 208 accessed the URL using the Internet or an internal repository of URLs. "Time taken to download" 534 provides an indication of how long it took a robot 208 to download the web page associated with the corresponding URL in the last crawl. Error condition 536 records any errors that were encountered by a robot 208 during the crawl. An example of an error condition is "HTTP 404", which indicates that the web page does not exist.

Referring to FIG. 5D, the structure of a status log 212 in accordance with one embodiment is described. There is a record 550 for each URL that has been crawled by a robot 208. The record 550 records the full URL 552 associated with the record as well as a fingerprint 554 of the corresponding URL 552. In the embodiment illustrated in FIG. 5D, status log 212 further comprises crawl status 524 and content checksum 526, as described above in conjunction with FIG. 5C. Further, status log 212 comprises the outgoing links 556 that were identified in the web page associated with the URL 552 during the crawl. The outgoing links 556 comprise a list of the URL fingerprints of the URLs that are found in the web page. Further still, status log 212 has a duplicate status field 558 that stores information about whether DupServer 224 has identified the corresponding URL 552 as a duplicate (i.e., non-canonical) URL or not.

Step 314.

In step 314, indexers 232, 240 and 242 obtain documents from the RTlogs on a high throughput basis, and generate indices for those documents. When the indices are provided to the servers of the front-end querying system (not shown), these documents become searchable by the users of the front-end querying system.

Step 316.

In step 316, global state manager 216 reads link logs 214 and uses the information in the log files to create link maps 220 and anchor maps 238. Link maps 220 are keyed by the fingerprints of the source URLs in the link logs (i.e., the URLs that respectively correspond to each record 502). The records in link map 220 are similar to records 502 in link log 214 with the exception that text 506 is stripped and the records are keyed by the fingerprint of the normalized value of the source URL. Link maps are used by page rankers 222 to adjust the page rank of URLs within data structure 100. Such page rankings persists between epochs.

In addition to creating link maps 220, global state manager 216 creates anchor maps 238. In contrast to records in a link map 220, records in an anchor map 238 are keyed by the fingerprints of outbound URLs 504 present in link log 214 (FIG. 5A). Thus, each record in an anchor map 238 comprises the fingerprint of an outbound URL 504 and the text 506 that corresponds to the URL 504 in link log 214. Anchor maps 238 are used by indexer 232, 240 and 242 to facilitate the indexing of "anchor text" as well as to facilitate the indexing of URLs that do not contain words. For example, consider the case in which the target document at an outbound URL 504 is a picture of Mount Everest and there are no words in the target document. However, text 506 associated with the URL 504 states that "To see a picture of Mount Everest view this link." Text 506, although not in the target document at outbound URL 504, indicates that the outbound URL 504 has to do with "Mount Everest". Thus, indexers 232, 240 and 242 use anchor maps 238 to make associations between outbound URLs 504 and text 506. These associations are used to index outbound URLs for searching by users in a front-end search system (not shown).

Anchor Tags: Extrinsic Information about Documents

Figure 6:
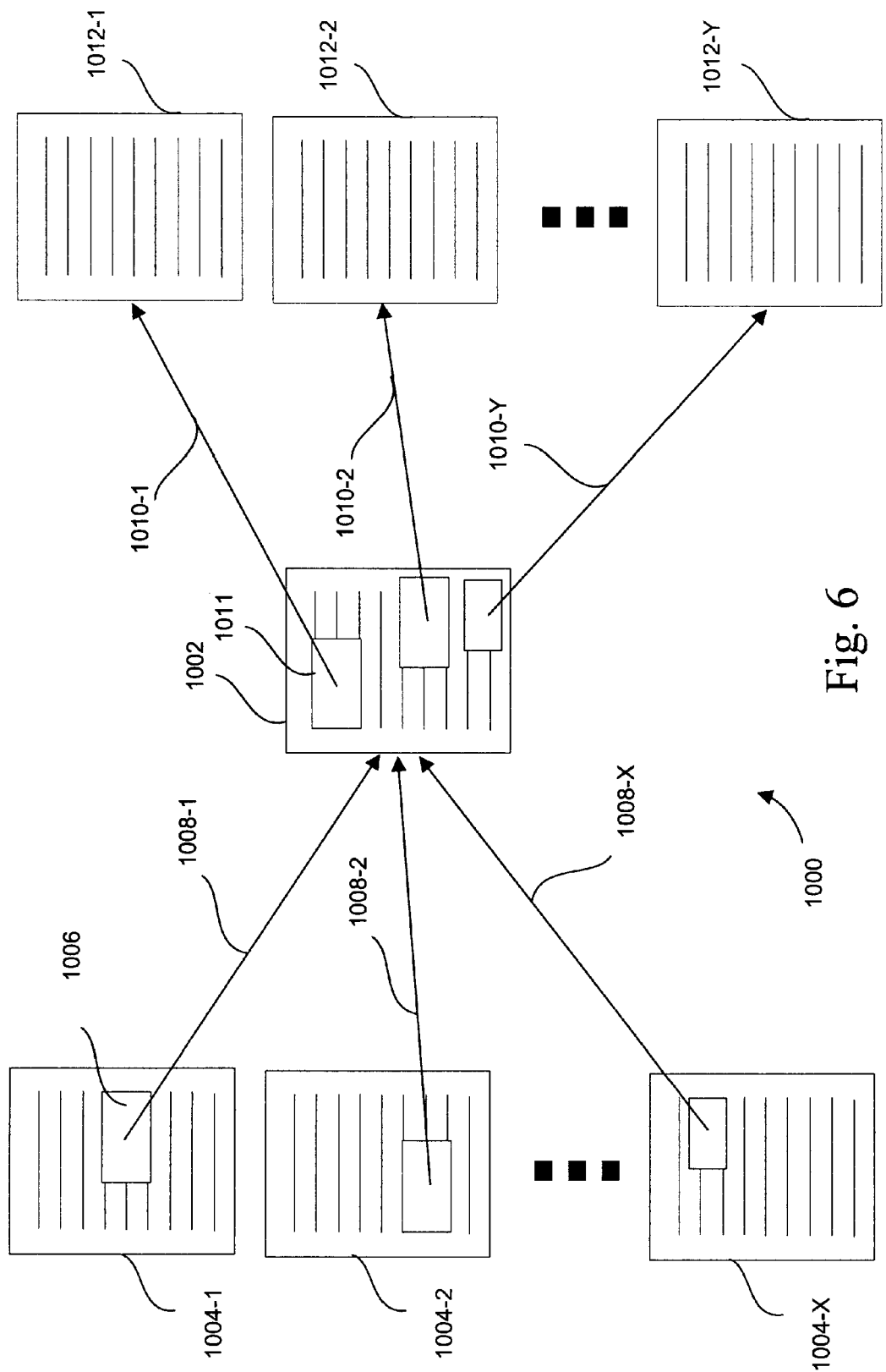
FIG. 6 illustrates part of a collection of documents in which some documents contained annotated links to other documents.

Referring to FIG. 6, a collection 1000 of documents is depicted. The documents 1002, 1004, and 1012 may be one of any number of types of information that can be transmitted over a network, including text files, word processing files, audio clips, video clips, and any other type of electronic data. The collection of documents made available to computers over the Internet in this way is commonly referred to as the World Wide Web ("the Web"). Each document 1002, 1004, and 1012 in the collection 1000 is locatable via a respective document address. In embodiments where collection 1000 is all or part of the Web, the respective document addresses are typically uniform resource locators ("URLs"). In other embodiments, the respective document addresses include other forms of network addresses. In still other embodiments, the entire collection 1000 may reside on one computer system, the respective document addresses including file system directory information.

In one embodiment, the documents 1002, 1004, and 1012 in collection 1000 are available at URLs from one of the segments 112 (FIG. 1) in base layer 102. In other embodiments, the documents 1002, 1004, and 1012 in collection 1000 are available at URLs, the URLs belonging to a subset of the segment 112 in base layer 102. Such a subset is referred to as a partition of segment 112. In still other embodiments, the documents 1002, 1004, and 1012 in collection 1000 are available at URLs, the URLs belonging to daily crawl layer 104. In other embodiments, the documents 1002, 1004, and 1012 in collection 1000 are available at URLs, the URLs belonging to real-time crawl layer 106. In a preferred embodiment, collection 1000 includes a large subset of the documents available on the World Wide Web, currently comprising approximately 3 billion documents.

Referring again to FIG. 6, document 1002 contains a plurality of outbound links 1010. Each outbound link 1010 points to a target document address, typically the URL of a target document. For example, link 1010-1 points to the URL of target document 1012-1. Links 1010 are typically contained within a region 1011 of document 1002 known as an "anchor tag." The structure and function of anchor tags are well-known to those of skill in the art of hypertext markup language (HTML) composition and interpretation. Amongst other features, anchor tag 1011 may include anchor text. Anchor text is contained in document 1002 near the URL associated with link 1011. Typically, the anchor text in anchor tag 1011 is delimited by the opening and closing markup tags "<a>" and "</a>," respectively.

The anchor text in anchor tag 1011 may contain useful information about document 1012-1. For example, the anchor text may include the statement "this is an interesting website about cats." If document 1012-1 is unavailable for retrieval at the time crawling of collection 1000 is performed, this anchor text provides textual information that can be searched by keyword. Document 1012-1 may be unavailable for crawling because the server on which it is hosted is not operational at the time of crawling, the server on which it is hosted challenges the robot for a password, or any number of other reasons. Additionally, document 1012-1 may be an image file, a video file, or an audio file, in which case there is no textual information readily available from the contents of document 1012-1. So, if the text from anchor tag 1011 is indexed as part of the indexing of document 1012-1, a user who submits a query containing the term "cat" may receive a list of documents including document 1012-1. Another advantage of indexing the anchor text from anchor tag 1011 together with document 1012-1 occurs in cases where document 1002 contains more accurate information about document 1012-1 than the textual contents of document 1012-1 itself. For example, document 1002 may be a relatively authoritative web page that contains text near or in an anchor tag associated with link 1010-1 stating that "the server that hosts web page 1012-1 is frequently unavailable." Page 1012-1 may contain no text indicating that it is frequently unavailable. If page 1012-1 is successfully crawled and indexed, a user of a search engine employing the index will have no way to learn of the potential unavailability of page 1012-1 unless information from page 1002 is returned in response to a query.

In addition to outbound links 1010, associated with document 1002 are inbound links 1008. Relative to inbound link 1008-1, for example, document 1002 is a target document. Thus, source document 1004-1 includes link 1008-1, link 1008-1 pointing to the URL at which document 1002 resides. Document 1004-1, which is a source document relative to link 1008-1, may also contain an annotation in region 1006 of link 1008-1. The annotation may also be an anchor tag. Although, as depicted in FIG. 6, source documents 1004 containing links 1008 pointing to the URL of target document 1002 contain only one link, documents 1004 may contain any number of links.

Processing Link Logs.

Figure 7:
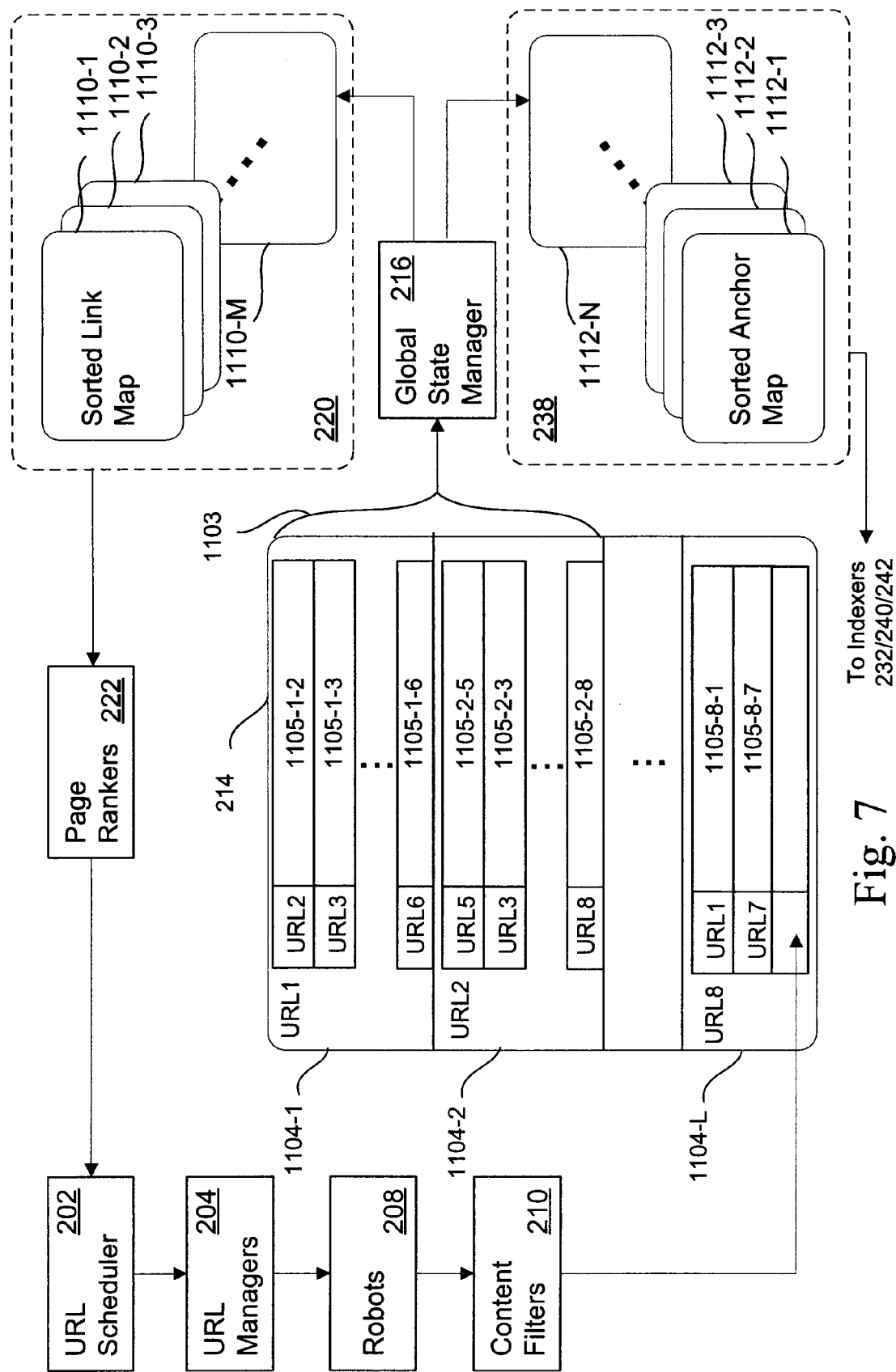
FIG. 7 is a schematic diagram of part of a web crawling system, including a global state manager.

FIG. 7 depicts part of a web crawling system in accordance with some embodiments. As described previously, in conjunction with the discussions of FIGS. 2, 3A, and 3B, above, URL scheduler 202, URL managers 204, robots 208, and content filters 210 interact to produce link log 214. Link log 214 includes one or more link log records 1104. Each record 1104 includes a respective source document identifier, a respective list of target document identifiers, and, preferably, a respective list of annotations. For example, record 1104-1 includes the source document identifier "URL1." In a preferred embodiment, the source document identifier is a URL fingerprint (also referred to as "URL FP" or simply as "FP") associated with the URL. A URL fingerprint is preferably a 64-bit integer determined by applying a hash function or other one way function to a URL. Record 1104-1 also contains a list of target document identifiers, the list including "URL2," "URL3," and "URL6." Each of the target document identifiers are preferably represented by URL fingerprints in link log 214.

In a preferred embodiment, each record 1104 in link log 214 further includes a respective list of annotations 1105. For example, in FIG. 7 record 1104-1 includes a list of annotations 1105, the list including annotations 1105-1-2, 1105-1-3, and 1105-1-6. An annotation 1105 can include text from an anchor tag in the document at the source document address corresponding to the source document identifier URL1. The text included in an annotation 1105 can be a continuous block of text from the source document, in which case it is referred to as a text passage Annotations 1105 also, in some embodiments, include text outside the anchor tag in the document referred to by URL1. For example, a text passage for inclusion in annotation 1105 may be determined from text within a predetermined distance of an anchor tag in a source document. The predetermined distance could be based on a number of characters in the HTML code of the source document, the placement of other anchor tags in the source document, or any one of a number of other predefined criteria, hereinafter called anchor text identification criteria.

In some embodiments, annotations 1005 also include a list of attributes of the text they include. The list may contain one, two, or any number of entries. When the text in annotation 1105 is included in a source document that is composed in HTML, examples of attributes include, but are not limited to:

Emphasized, as when the text is enclosed by the HTML tags <EM> and </EM>;

Citation, as when the text is enclosed by the HTML tags <CITE> and </CITE>;

Variable name, as when the text is enclosed by the HTML tags <VAR> and </VAR>;

Strongly Emphasized, as when the text is enclosed by the HTML tags <STRONG> and </STRONG>; and Source Code, as when the text is enclosed by the HTML tags <CODE>Source Code</CODE>.

Other examples of attributes include text position, number of characters in the text passage, number of words in the text passage, and so on.

Referring again to FIG. 6, the relationship amongst the source document identifier URL1, the list of target document identifiers in record 1104-1, and the list of annotations in record 1104-1 will now be explained. URL1 may be the fingerprint of the URL at which document 1002 resides. In this case, each entry in the list of target document addresses in record 1104-1 correspond to a link 1010 in document 1002. Thus, target document identifier URL2 may be the URL fingerprint of the URL to which link 1010-1 points. Similarly, target document identifier URL3 may be the URL fingerprint of the document to which link 1010-2 points. Each entry in the list of annotations 1105 preferably also refers to a link 1010 in document 1002. Thus, annotation 1105-1-2 may contain text from the anchor tag 1011 associated with link 1010-1. As a final example, if source document identifier URL8 in record 1104-L from link log 214 (FIG. 7) includes the URL fingerprint of the URL at which document 1004-1 (FIG. 6) resides, URL1 will be the URL fingerprint of the URL at which document 1002 resides, and annotation 1105-8-1 may include text from anchor tag 1006 in document 1004-1.

Production of Sorted Link Maps and Sorted Anchor Maps.

Referring to FIG. 7, global state manager 216 accesses a portion 1103 of link log 214. Global state manager 216 then produces sorted link map 1110-M and sorted anchor map 1112-N. In some embodiments, production of link map 1110-M and anchor map 1112-N do not occur simultaneously, as explained in more detail in conjunction with the discussion of FIG. 8, below. In a preferred embodiment, the portion 1103 of link log 214 that is accessed by global state manager 216 is chosen by global state manager 216 so that all records 1104 in portion 1103 can reside in the random access memory (RAM) of global state manager 216. For example, portion 1103 may correspond the largest subset of records 1104 that require no more than 1 GB (gigabyte) of RAM to store. In this way, the processing necessary to produce sorted anchor map 1112-N and sorted link map 1110-M can be performed rapidly, as minimal access to secondary storage, such as a hard disk drive, in required by global state manage 216.

Figure 9:
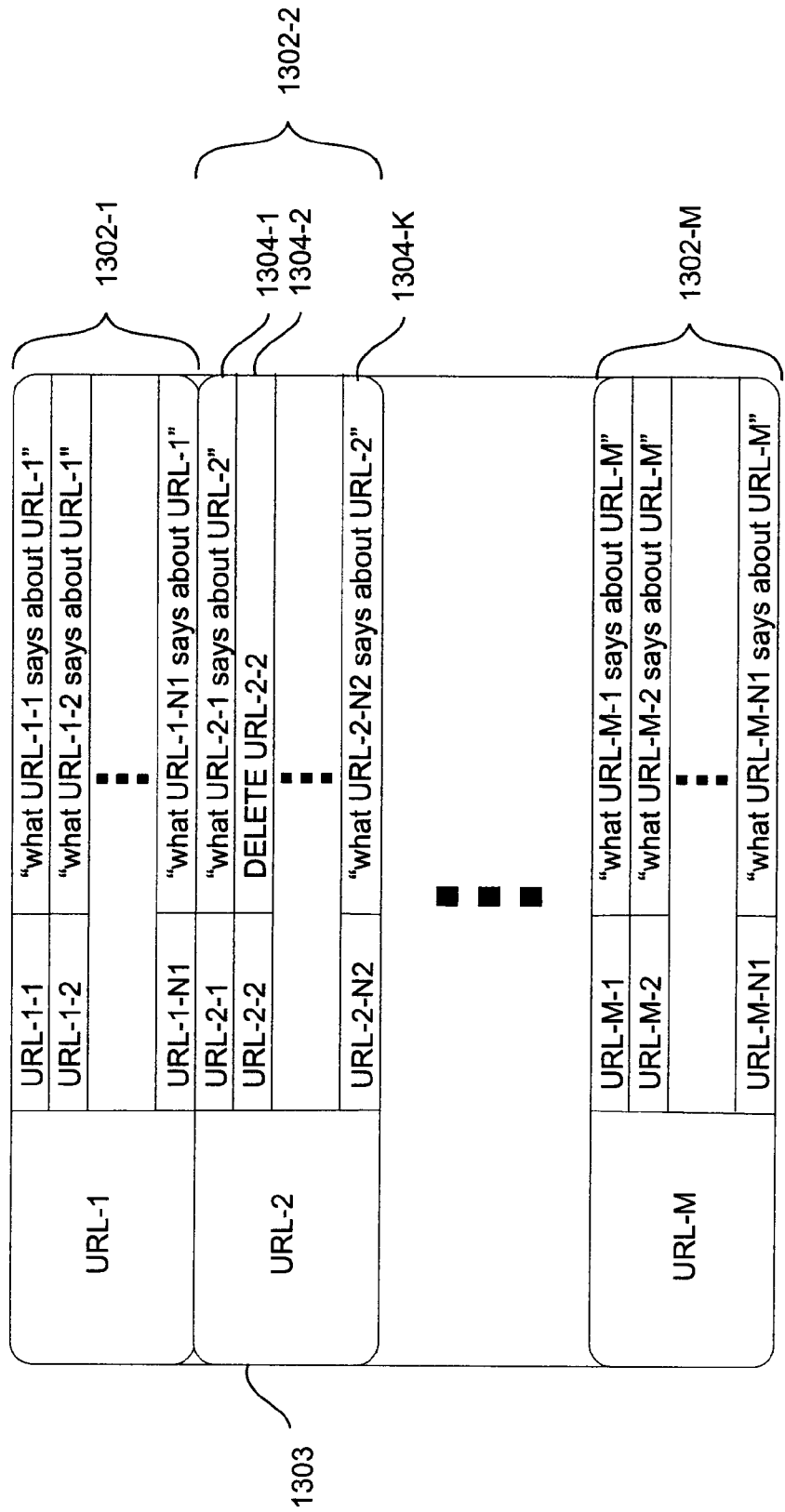
FIG. 9 illustrates details of a sorted anchor map.

Referring to FIG. 9, the structure of a sorted anchor map 1112 is depicted. Anchor map 1112 may contain annotations 1304 that include information from the anchor tags in source documents. The advantages of providing this information to indexer 232/240/242 have been described above. Indexer 232/240/242, in some embodiments, is configured to build an index of the collection of documents based, at least in part, on the sorted anchor map. When the search engine receives a query, not only can it search the contents of a document itself for one or more of the query terms; it can also search any annotations associated with a document for one or more of the query terms.

Only one set 238 (FIG. 9) of sorted anchor maps 1112 is maintained, even in embodiments where the base layer, daily layer, and real-time layer are crawled simultaneously. Sorted anchor map 1112 includes one or more anchor map records 1302. Each record 1302 includes a respective target document identifier, a respective list of source document identifiers, and a respective list of annotations. For example, record 1302-2 includes source document identifier 1303. In a preferred embodiment, target document identifier 1303 is a URL fingerprint of a corresponding URL. Identifier 1303 contains the URL fingerprint URL-2. Records 1302 are ordered in map 1112 in accordance with their respective target document identifiers. In some embodiments where the target document identifiers are URL fingerprints, records 1302 are ordered so the target document identifier monotonically increases with the position of the record in the map. For example, in these embodiments URL-2 is greater than URL-1, so record 1302-2 appears after record 1302-1 in map 1112. In other embodiments where the target document identifiers are URL fingerprints, records 1302 are ordered so the target document identifier monotonically decreases with the position of the record in the map. When indexers 232, 240, or 242 (not shown) access map 1112 for information about a particular target document identifier, not all records 1304 need to be searched in embodiments where records 1304 are ordered based on the target document identifier. For example, binary search techniques can be used to quickly locate the record corresponding to the particular target document identifier.

Referring again to FIG. 9, record 1302-2 further includes a list of source document identifiers, including the entries URL-2-1, URL-2-2, . . . , URL-2-N2. Each entry in the list of source document identifiers corresponds to a source document address. Additionally, the source document residing at each of the corresponding source document addresses contains a link pointing to the target document residing at the URL corresponding to the target document identifier 1303. Thus, for example, the document at the URL corresponding to URL-2-1 contains a link pointing to the document corresponding to URL-2. The source document identifiers are preferably the URL fingerprints of their corresponding source document addresses.

In addition to the list of source document identifiers, record 1302-2 includes a list of annotations 1304. Each annotation 1304 is associated with an entry in the list of source document identifiers. For example, annotation 1304-1 is associated with URL-2-1, annotation 1304-2 with URL-2-2, and so on. An annotation 1304-1 may contain text near or in an anchor tag in the source document corresponding to the associated source document identifier. For example, when annotation 1304-1 contains the text "what URL-2-1 says about URL-2," this text is found in the source document corresponding to URL fingerprint URL-2-2.

Sometimes, annotation 1304 is a delete entry. For example, annotation 1304-2 is a delete entry. A delete entry is generated by global state manager 216 (FIG. 7) when it determines that a link no longer exists. For example, global state manager 216 may have written a record in sorted anchor map 1112-1 (FIG. 7) with target document identifier URL-2 and a respective entry for source document identifier URL-2-2. Later, manager 216, by examining link log 214, layered set 220 of sorted link maps 1110, or both, may determine that the document corresponding to URL-2-2 no longer contains a link to the document corresponding to URL-2. To address this situation, the global state manager 216 is configured to generate a delete entry 1304-2 in the current sorted anchor map 1112.

Figure 10:
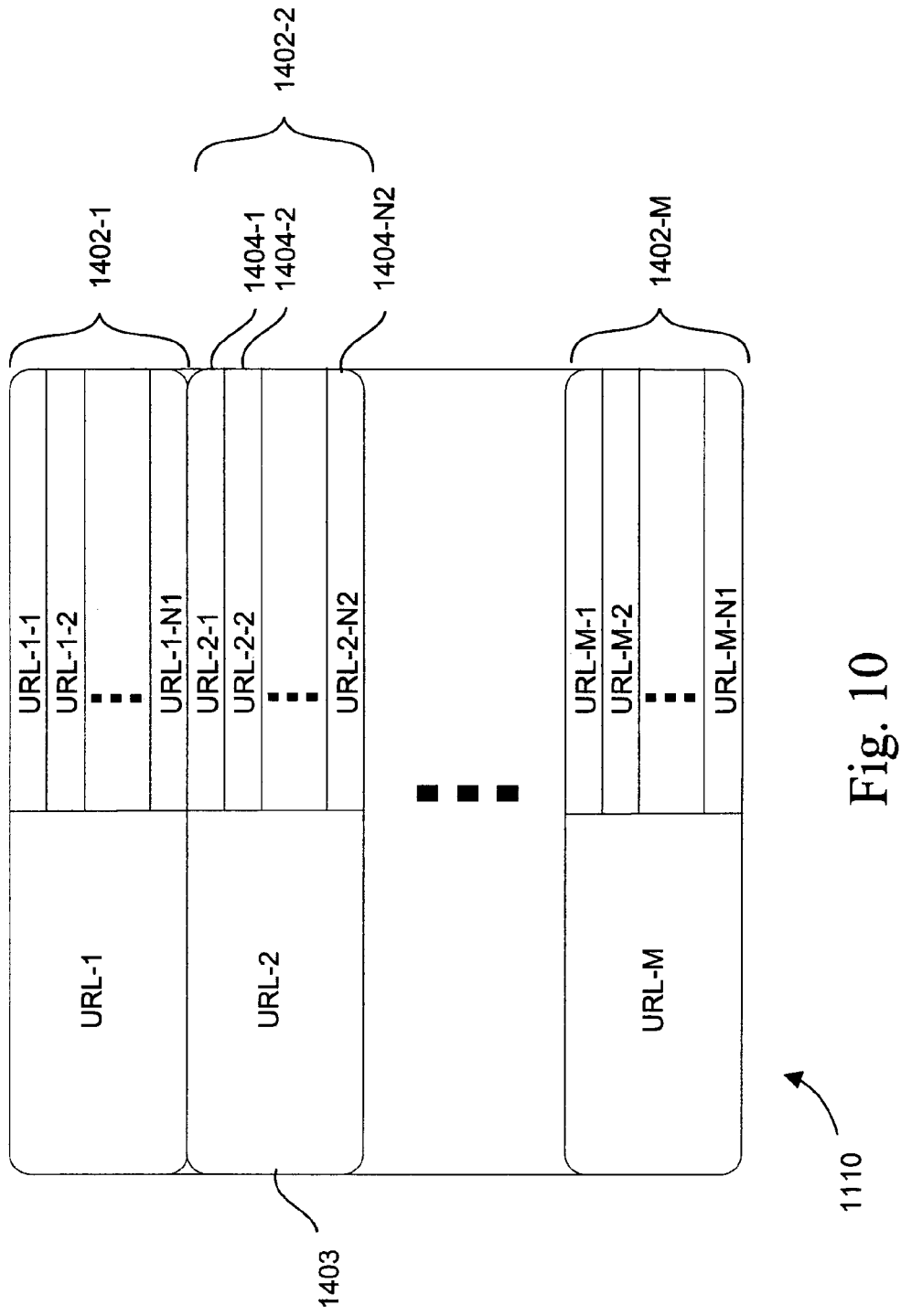
FIG. 10 illustrates details of a sorted link map.

Referring to FIG. 10, details of a sorted link map 1110 are depicted. Map 1110 includes one or more link map records 1402. Each record 1402 includes a respective source document identifier. For example, record 1402-2 contains source document identifier 1403. The source document identifiers are preferably URL fingerprints. Thus, source document identifier 1403 contains URL fingerprint URL-2. URL-2 is the fingerprint of a URL of an associated source document. For example, URL-2 is the fingerprint of document 1002 (FIG. 6). Each record 1402 further includes a list of target document identifiers. For example, record 1402-2 contains a list of target document identifiers 1404. Target document identifiers 1404 are preferably URL fingerprints. Continuing the example, target identifiers 1404 each correspond to a link contained in source document 1002 (FIG. 6) corresponding to (and identified by) source document identifier URL-1. Thus document 1002 contains a link 1010-1 to document 1012-1, and there is a corresponding target document identifier 1404-1 that corresponds to the URL in link 1010-1. In this case, the URL in link 1010-1 has a URL fingerprint URL-2-1 (FIG. 10), and document 1012-1 (FIG. 6) resides at this URL.

In addition to containing information about one or more source documents, map 1110 is organized so as to make the link information readily accessible. Referring again to FIG. 10, records 1402 are ordered in map 1110 based on their respective source document identifiers. In some embodiments where the source document identifiers are URL fingerprints, records 1402 are ordered so the source document identifier monotonically increases with the position of the record in the map. For example, in these embodiments, URL-2 is greater than URL-1, so record 1402-2 appears after record 1402-1 in map 1110. In other embodiments where the target document identifiers are URL fingerprints, records 1402 are ordered so the source document identifier monotonically decreases with the position of the record in the map. When page rankers 222 (FIG. 7) access map 1110 for information about a particular source document identifier, not all records 1402 need to be searched in embodiments where records 1402 are ordered based on the source document identifier. For example, binary search techniques can be used to quickly locate the record corresponding to the particular source document identifier.

Merging Layered Sorted Maps.

Figure 8:
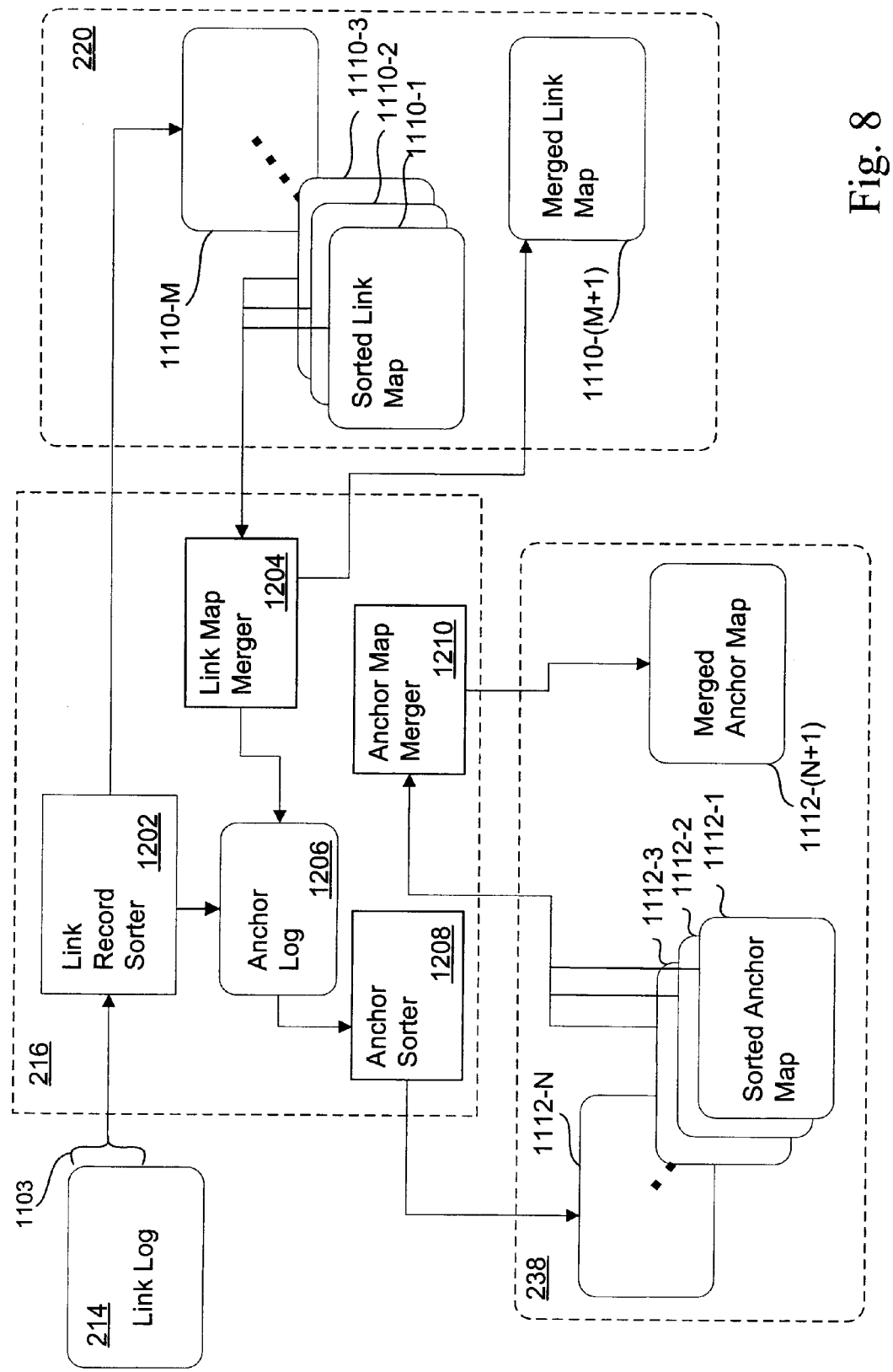
FIG. 8 is a schematic diagram of an embodiment of a global state manager, showing details of the interaction between the global state manager and the layered sets of sorted link maps and sorted anchor maps.

Referring to FIG. 8, sorted link maps 1110-1, 1110-2, and 1110-3 are produced by global state manager 216. Although, as depicted in FIG. 8, link record sorter 1202, link map merger 1204, anchor sorter 1208, and anchor map merger 1210 are separate modules in state manager 216, in other embodiments they may all be contained in the same module. In still other embodiments, any number of modules may perform the functions of state manager 216, with the duties of the various modules in FIG. 8 divided in any number of ways thereupon.

Specifically, sorted link maps 1110-1, 1110-2, and 1110-3 are produced by link record sorter module 1202 in global state manager 216 whenever a link log flush condition is satisfied. The flush condition may be a function of the time since a last link map was produced, the amount of new data present in the link log 214, the amount of memory available to the global state manager (i.e., memory available in the server that executes the global state manager) or any combination or subset thereof. Link record sorter 1202 outputs each sorted link map 1110 at a specific time, referred to as an associated production time. Each sorted link map 1110 is thus associated with a production time. The production time of a sorted link map 1110 may be stored explicitly in the map. In some embodiments, the production time is implicitly stored by the position of a sorted link map 1110 in the layered set 220 of sorted link maps. Thus, sorted link map 1110-2 can be determined to have an associated production time that is earlier than that of sorted link map 1110-3 but later than that of sorted link map 1110-1.

In addition to outputting sorted link maps 1110, link record sorter 1202 writes to anchor log 1206. Anchor log 1206 includes a plurality of records. The records in anchor log 1206 have a format similar to that of the records in link log 214. Some records in anchor log 1206 includes a source document identifier, a list of target document identifiers, and a list of annotations. Records in anchor log 1206 can also contain a delete link entry or a delete node entry. A delete link entry includes a source document identifier, a target document identifier, and a special marker in the annotation field of the record indicating that all links between the source document identifier and the target document identifier are to be removed. Link record sorter 1202 generates a delete link entry when it encounters two records for a particular source document a portion 1103 of link log 214 (shown in FIG. 7), and the two records contain contradictory information about the target documents of the particular source document. For example, when a first and a second record both contain URL1 as the source document identifier, the first record contains URL2 in the list of target document identifiers, and the second record does not contain URL2 in the list of target document identifiers, sorter 1202 may generate a delete link entry. If the first record is older (appearing earlier in link log 214) than the second record, sorter 1202 generates a delete link entry in anchor log 1206. The delete link entry contains URL1, URL2, and a special marker as the source document identifier, the target document identifier, and the annotation, respectively. If, on the other hand, the first record is newer (appearing later in log 214) than the second record, the link from URL1 to URL2 was published after the generation of the second record. Thus, in this case, sorter 1202 does not generate a delete link entry.

A delete node entry is generated by link record sorter 1202 when sorter 1202 determines, based on the records in portion 1103 of link log 214, that a target (or source) document has been removed altogether. For example, if by comparing the records in link log 214 it is determined that two links no longer exist, both of which point to URL2, sorter 1202 determines in some embodiments that the document corresponding to URL2 has disappeared altogether and generates an appropriate delete node entry. Alternately, the web crawler may receive information when attempting to download URL2 that the document no longer exists, and this information may be inserted by the content filters 210 into the link log 214. That information in the link log 214 is then used by the global state manager 216 to generate a delete node entry in a sorted link map. A delete node entry includes the document identifier of the document to be deleted, and a special marker identifying the record as a delete node entry.

Referring back to FIG. 7, when page rankers 222 require information from the layered set 220 of sorted link maps about a document with a particular source document identifier, page rankers 222 sometimes search each sorted link map 1110 in layered set 220. If more than one record containing the particular source document is found, each record possibly from a different map 1110, page rankers 222 must determine how to merge the information in the more than one record. In some embodiments, page rankers 222 simply take the most recent information available in set 220, i.e., the respective list of target documents from the record containing the particular source document identifier in the sorted link map 1110 with the most recent production time. Other records that contain the particular source document identifier are disregarded. In one embodiment, page rankers 222 need not traverse all the maps 1110 in layered set 220 to determine the information required about a particular source document. Rather, page rankers 222 traverse maps 1110 in order of descending recency. Thus, map 1110-N is searched first, followed by map 1110-(N−1), map 1110-(N−2), and so on. However, in other embodiments, all the maps 1110 are searched in parallel, using parallel threads or servers, because this is the fastest and most efficient way to search the sorted link maps. While this methodology may appear to use more resources, it completes the search task faster, which is of primary importance in a web crawler that crawls very large numbers of pages (e.g., hundreds of billions of pages).

Once produced, sorted link maps 1110 are not written to again. To prevent the amount of storage required for layered set 220 from increasing indefinitely as new sorted link maps 1110 are added to set 220, and to keep the access time for lookup of a particular source document identifier (for example, by page rankers 222) from becoming too long, a mechanism is needed to consolidate the information contained in older maps in layered set 220 of link maps 1110. Thus, global state manager 216, when a merge condition has been satisfied, performs a merge operation on a subset of the maps 1110 in layered set 220. In some embodiments, state manager 216 may have a predetermined time schedule for determining when the merge condition has been satisfied and, consequently, when to perform merge operations. For example, state manager 216 may periodically merge subsets of maps 1110. In other embodiments, other criteria are used as part of the merge condition. For example, state manager 216 may find that the merge condition is satisfied any time the number of maps 1110 in set 220 exceeds a predetermined number. As another example, the merge condition may be satisfied any time state manager 216 has been idle for a predetermined amount of time or predetermined number of processor cycles. The merge condition may also be a function of the amount of link data in the unmerged sorted link maps 1110 (the amount of link data may vary from one set of sort link maps to another).

Referring to FIG. 8, link map merger module 1204, part of global state manager 216, performs a merge operation on a subset of the set 220 of sorted link maps 1110. Although in FIG. 8 the subset contains the three maps 1110-1, 1110-2, and 1110-3, in other embodiments and under other conditions the subset could contain fewer or more maps. The set of sorted link maps that are merged are generally contiguous or neighboring maps within the layered set 238 of sorted link maps 1110. Furthermore, the sorted link maps that are merged are preferably similar in size, for example, having sizes that are within a factor of 2 of each other. Merging large files with much smaller files is less efficient, in terms of computational resources used, than merging similarly sized files. Thus, small link maps are merged with other small link maps, and similarly sized, larger merged link maps are merged with each other.

Merger 1204 outputs merged link map 1110-(M+1). Merged link map 1110-(M+1) includes one or more records, each record containing a source document identifier and list of target document identifiers. Each record in map 1110-(M+1) contains the same document identifier as one or more records in the subset of sorted link maps. When more than one record in the subset exists for a particular source document identifier, the most recent record is transferred to merged map 1110-(M+1). Additionally, the merge operation may generate delete link and delete node entries in anchor log 1206 upon detecting contradictory information in two or more records in the subset for a particular source document identifier. Finally, after generation of map 1110-(M+1) is complete, the link map merger 1204 outputs the merged link map to layered set 220 and schedules the link maps 1110 in the merged subset (in FIG. 8, maps 1110-1, 1110-2, and 1110-3) for destruction at a later time. The merged link maps are retained temporarily to enable rollbacks and other recovery operations.

Still referring to FIG. 8, sorted anchor maps 1112-1, 1112-2, and 1112-3 are produced by global state manager 216 at various production times. The production times of each sorted anchor map 1112 may be stored explicitly or implicitly, for example by ordering in the layered set 238 of sorted anchor maps 1112. Anchor sorter 1208, part of state manager 216, outputs sorted anchor maps 1112 at their respective production times. When generating a sorted anchor map 1112, sorter 1208 reads all or a portion of anchor log 1206 and consolidates all of the information about a particular target document therein, generating an anchor map record for the particular target document. Sorter 1208 repeats this process for all target document identifiers in anchor log 1206, generating a plurality of anchor map records. If there are any delete link or delete node entries for the particular target document, they are processed if possible or left in the record. It is not possible to process a delete link entry, for example, when the portion of the anchor log 1206 selected for processing by sorter 1208 contains no other information about the referenced link. Finally, sorter 1208 sorts all consolidated records based on the value of their respective target document identifiers and outputs a sorted anchor map 1112.

Indexers access information in the set 238 of sorted anchor maps, and must access all maps 1112 containing a particular target document identifier. Referring back to FIG. 7, when indexers 232/240/242 require information from the layered set 238 of sorted anchor maps about a document with a particular target document identifier, indexers 232/240/242 sometimes search each sorted anchor map 1112 in layered set 238. If more than one record containing the particular target document is found, each record possibly from a different map 1112, indexers 238 must determine how to merge the information in the more than one record. In a preferred embodiment, indexers 232/240/242 simply take all the information available in set 238, i.e., the lists of target documents from all records containing the particular target document identifier in the sorted anchor map 1112. In these embodiments, indexers 232/240/242 222 must traverse all the maps 1112 in layered set 238 to determine the information required about a particular target document.

In some embodiments, the indexers also access information in the set 238 of sorted anchor maps corresponding to links to one or more duplicates of a page that is being indexed. In these embodiments, the RTlog entry for a page contains a list of the URL fingerprints of a set of such duplicate pages (for pages having duplicate pages). The list is preferably limited in size to have no more than K entries, where K is a predetermined integer, preferably having a value between 2 and 10. The indexers access the anchor text for the links pointing to each of the identified duplicate pages and index that anchor text as part of the process of indexing the page. As a result, a wider range of anchor text is included in the text that is treated as being part of or associated with a page for purposes of indexing the content of the page. This is particularly useful, for instance, when one or more of the links to one or more of the non-canonical pages has anchor text in a different language than the anchor text of the links to the canonical page.

Global state manager 216, when an anchor merge condition has been satisfied, performs a merge operation on a subset of the maps 1112 in layered set 238. In some embodiments, state manager 216 may have a predetermined time schedule for determining when the anchor merge condition has been satisfied and, consequently, when to perform anchor merge operations. For example, state manager 216 may periodically merge subsets of maps 1112. In other embodiments, other criteria are used as part of the anchor merge condition. For example, state manager 216 may find that the anchor merge condition is satisfied any time the number of maps 1112 in set 238 exceeds a predetermined number, or the amount of data in the maps 1112 exceeds a predefined threshold. As another example, the anchor merge condition may be satisfied any time state manager 216 has been idle for a predetermined amount of time or predetermined number of processor cycles.??

Referring to FIG. 8, when global state manager 216 detects that an anchor merge condition has been satisfied, anchor map merger 1210 performs a merge operation on a subset (1112-, 1112-2, and 1112-3) of layered set 238 of sorted anchor maps 1112. As a result, anchor map merger 1210 produces merged anchor map 1112-(N+1). The anchor merge condition is not necessarily satisfied at the same time that the link merge condition related to set 220 is satisfied. Anchor sorter 1208 outputs sorted anchor maps 1112 at specific times, referred to hereafter as associated production times. Each sorted anchor map 1112 is thus associated with a production time. The production time of a sorted link map 1112 may be stored explicitly in the map. In preferred embodiments, the production time is implicitly stored by the position of a sorted anchor map 1112 in the layered set 238 of sorted anchor maps. Thus, sorted anchor map 1112-2 can be determined to have an associated production time that is earlier than that of sorted anchor map 1112-3 but later than that of sorted anchor map 1112-1.

Figure 11:
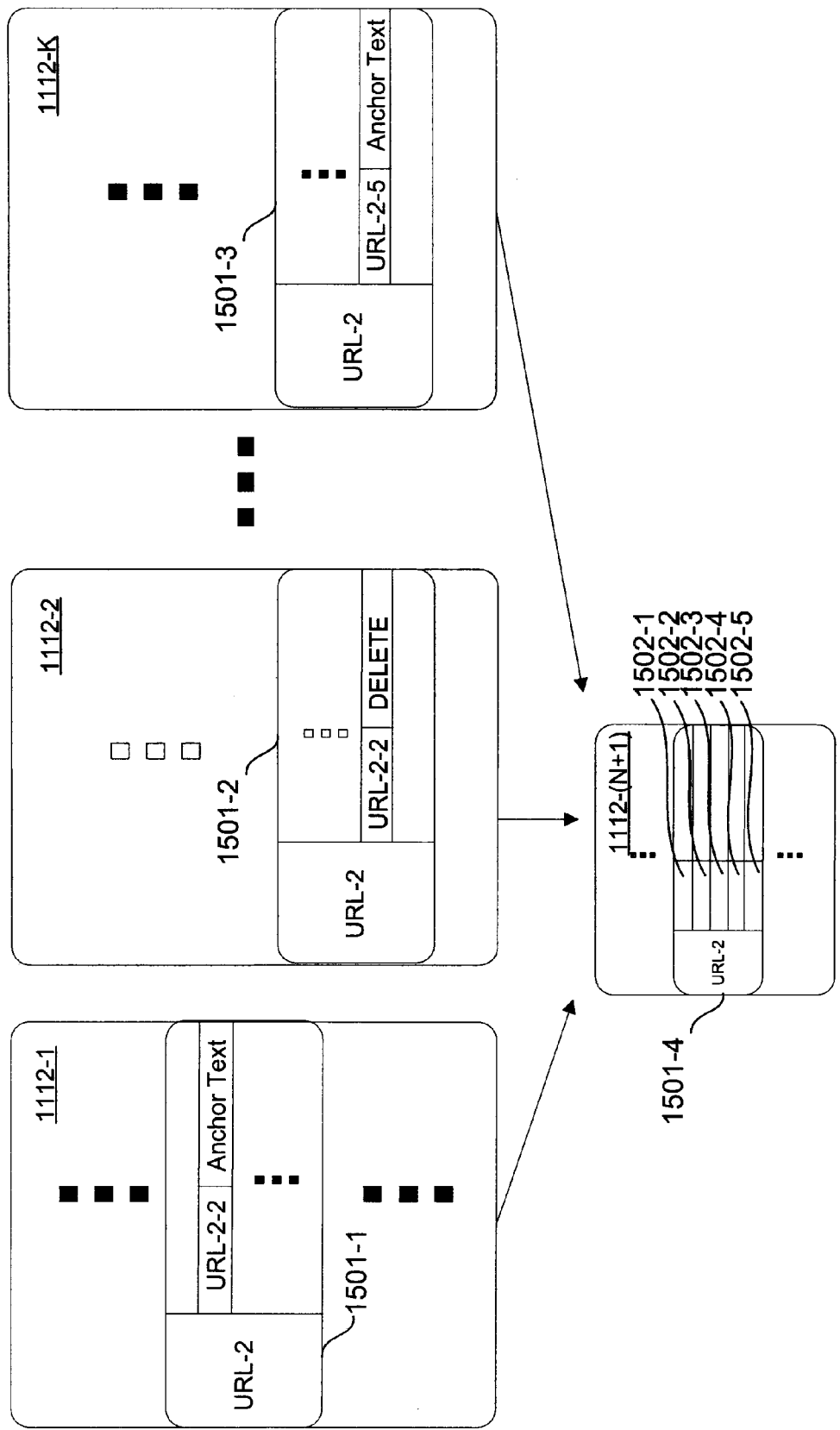
FIG. 11 illustrates a merging operation performed on several sorted anchor maps, resulting in a merged anchor map.

Referring now to FIG. 11, the details of an anchor merge operation are described. First, a subset of sorted anchor maps 1112 are collected for merging. Although K such maps are shown in FIG. 11 (1112-1, 1112-2, ..., 1112-K), any number of two or more maps 1112 may be gathered for this purpose. In some embodiments, all records containing a particular target document identifier in the subset of maps 1112 are accessed, read, and flagged. All such records are flagged so that information contained therein is not processed twice. Flagging can comprise actual deletion of the record in its corresponding map, maintenance of a list (for example, in the anchor map merger 1210 in FIG. 8) extrinsic to the maps 1112, or by any one of a number of other means, as one skilled in the art of data structure design would readily appreciate. In FIG. 11, the particular target document identifier is URL-2. The set of all records 1501 containing source document identifier URL-2 include records 1501-1 from map 1112-1, record 1501-2 from map 1112-2, and record 1501-3 from map 1112-K. In record 1501-1, URL-2-2 appears in the list of source document identifiers, and some anchor text appears in a corresponding entry in the list of annotations. In record 1501-2, URL-2-2 appears in the list of source document identifiers, and a delete entry appears in a corresponding entry in the list of annotations. Because map 1112-2 is more recent than map 1112-1, the conflicting information about the link from URL-2-2 to URL-2 is resolved by not including URL-2-2 in the list of source document identifiers 1502 in merged anchor map 1112-(N+1). Were map 1112-2 less recent than map 1112-1, the conflict would be resolved by inserting URL-2-2 in the list of source document identifiers 1502. Record 1501-4 in merged anchor map 1112-(N+1) also contains, for a given target-source document pairing, the most recent annotation found from amongst the subset of sorted anchor maps 1112 being merged.

Page Ranking: Query-Independent Relevance Determination.

Once the layered set 220 of sorted link maps 1110 contains at least one sorted link map, a page rank can be computed for one or more documents. Page rankers 222 (FIG. 2) compute a page rank for a given document by considering not only the number of documents that contain links pointing to the URL at which the document resides, but also the page rank of such documents. For example, referring to FIG. 6, documents 1004-1, 1004-2, ..., 1004-X all contain links 1008 pointing to the URL at which document 1002 resides. Thus, the page rank of document 1002 depends on the number of links 1008 as well as the page ranks of documents 1004. Each of the documents 1004 may contain other links, not depicted, that do not point to the URL of document 1002. The page rank of document 1002 is given, in some embodiments, by the expression $$PR(1002)=(1-d)+d*(PR(1004-1)/C(1004-1)+PR(1004-2)/C(1004-2)+ \ldots +PR(1004-X)/C(1004-X)),$$

where PR(n) denotes the page rank of document n, C(n) is the number of outgoing links in document n, and d is a number in the range between 0 and 1. In some embodiments, d is 0.85.

To compute the page rank of one or more documents based on the information contained in layered set 220 of link maps 1110, it is not easy to employ the above expression directly. Thus, in preferred embodiments, the computation of page rank proceeds by starting with an initial page rank for each document, computing, for one or more records in one or more maps 1110, a partial page rank contribution from the source document to each of the target documents in the record, and continuously updating the estimates of the page ranks of documents as new information becomes available from set 220. For example, in FIG. 6, the partial contribution of document 1002 to the document 1012-1 is $$PR_{1002}(1012-1)=d*PR(1002)/C(1002).$$

The current estimate of the page rank of document 1012-1 at any time is simply $$PR(1012-1)=(1-d)+\Sigma PR_n(1012-1),$$

where the sum is taken over all documents that are known to link to document 1012-1.

Page rank data can also be obtained from URL managers 204. A more complete explanation of the computation of page rank is found in U.S. Pat. No. 6,285,999, which is hereby incorporated by reference in its entirety.

A Computer System for Anchor Tag Processing.

Figure 12:
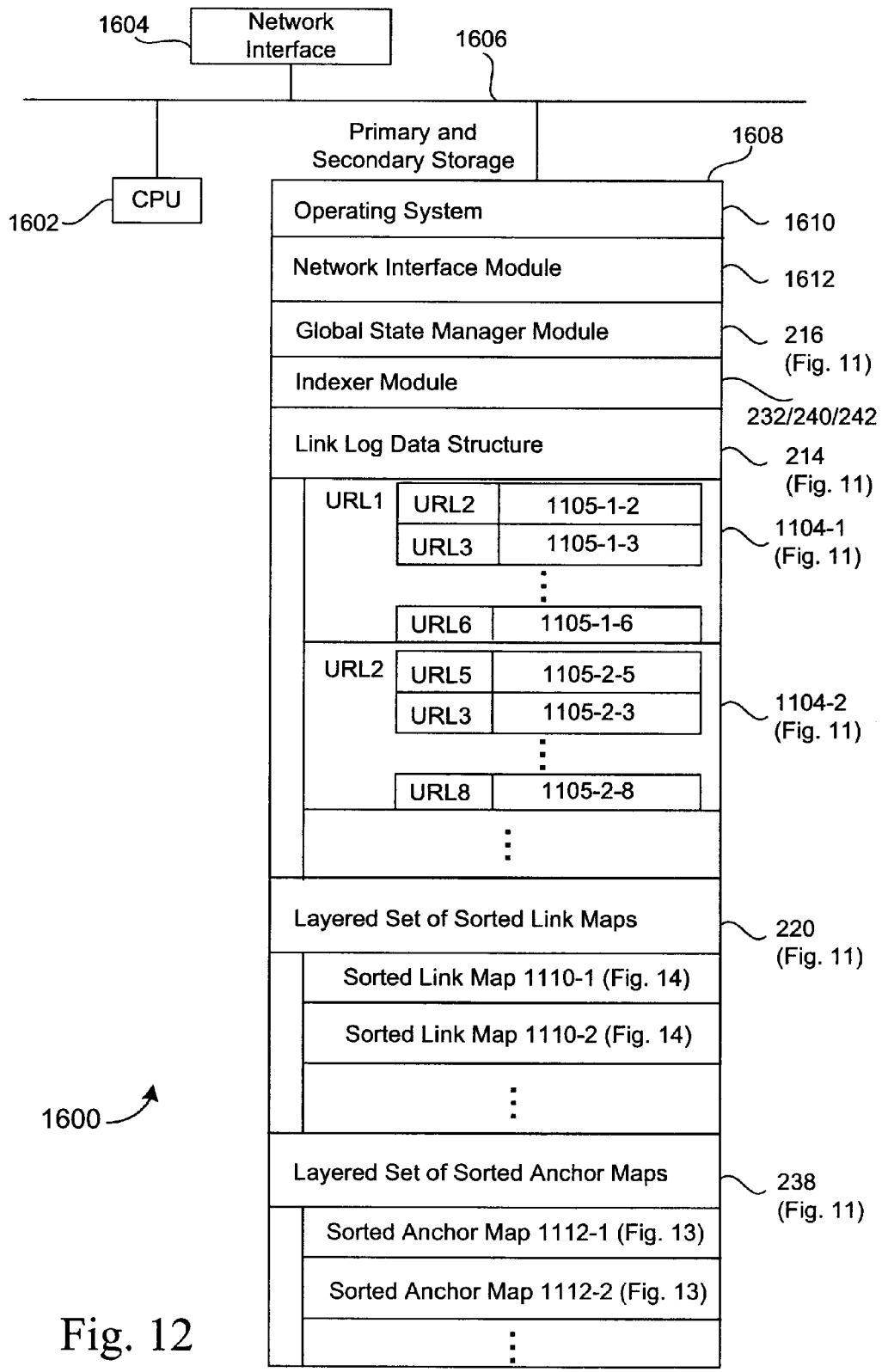
FIG. 12 is a block diagram of an embodiment of a computer system for implementing the methods disclosed herein.

In a preferred embodiment, web page indexing system 1600 is implemented using one or more computer systems, as schematically shown in FIG. 12. As will be appreciated by those of skill in the art, search engine systems designed to process large volumes of queries may use more complicated computer architectures than the one shown in FIG. 12. For instance, a front end set of servers may be used to receive and distribute queries among a set of back end servers that actually process the queries. In such a system, the system 1600 shown in FIG. 12 would be one of the back end servers.

The computer system will typically have one or more central processing units (CPU's) 1602, a network or other communications interface 1604, primary and secondary storage 1608, and one or more communication busses 1606 for interconnecting these components. Primary and secondary storage 1608 can include high speed random access memory and can also include non-volatile memory, such as one or more magnetic disk storage devices (not shown). Primary and secondary storage 1608 can include mass storage that is remotely located from the central processing unit(s) 1602. Primary and secondary storage 1608, or alternatively one or more storage devices (e.g., one or more nonvolatile storage devices) within storage 1608, includes a non-transitory computer readable storage medium. The primary and secondary storage 1608 or the non-transitory computer readable storage medium of storage 1608 preferably stores:

an operating system 1610 that includes procedures for handling various basic system services and for performing hardware dependent tasks;

a network interface module 1612 that is used for connecting the system 1600 to various other computers (e.g., the page rankers 222 and content filters 210 in FIG. 7) and for accessing and receiving associated log files (e.g., link log 214 in FIG. 7) via one or more communication networks, such as, the Internet, other wide area networks, local area networks, metropolitan area networks, and so on; and a global state manager module 216, configured to access a link log data structure 214, and preferably including instructions for writing to a sorted link map 1110 and a sorted anchor map 1112.

The primary and secondary storage 1608 or the non-transitory computer readable storage medium of storage 1608 of the computer system 1600 may also store one or more of the following additional modules and data structures:

an indexer module 232/240/242 for generating a real-time index, daily index, base index, or any subset or combination thereof;

a link log data structure 214, including one or more link log records 1104;

a layered set 220 of sorted link map data structures 1110; and a layered set 238 of sorted anchor map data structures 1112.

However, in some embodiments, the index modules and these data structures, or a subset thereof, are stored on different servers than the server that executes the global state manager module 216. These servers are interconnected by a high speed communication network, enabling the global state manager to efficiently perform its tasks despite the fact that the link log data it reads and/or the sets of maps it generates are stored elsewhere.

Preferably, link log data structure 214 further includes one or more link log records 1104. Each record 1104 preferably includes a respective source document identifier (URL1 in record 1104-1);

a respective list of target document identifiers (including URL2, URL3, and URL6 in record 1104-1); and a respective list of annotations 1105.

Global state manager 216 can include executable procedures, sub-modules, tables and other data structures. In some embodiments, global state manager 216 includes instructions for detecting the satisfaction of a merge condition and executing a merge operation. The merge condition may depend on any number of temporal or storage considerations. In some embodiments, global state manager 216 further includes instructions for detecting the satisfaction of an anchor merge condition and executing an anchor merge operation. The anchor merge condition may depend on any number of temporal or storage considerations.

All references cited herein are incorporated herein by reference in their entirety and for all purposes to the same extent as if each individual publication or patent or patent application was specifically and individually indicated to be incorporated by reference in its entirety for all purposes.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents

What is claimed is:

1. A computer system for processing information about documents in a collection of linked documents, the system comprising:
   one or more processors; and
   memory storing one or more programs, the one or more programs including instructions for:
   crawling at least a subset of the documents in the collection of linked documents;
   extracting, from the crawled subset of the documents in the collection of linked documents, information concerning a plurality of outbound links between documents in the collection of linked documents;
   generating an anchor map based on the information extracted from the collection of linked documents that concerns the plurality of outbound links between documents in the collection of linked documents, wherein the anchor map comprises a plurality of anchor records, and wherein a respective anchor record of the plurality of anchor records identifies:
   (A) a respective target document, wherein the respective target document is pointed to by one or more outbound links among the plurality of outbound links,
   (B) a list of inbound links identifying a set of source documents in the collection of linked documents that contain the one or more outbound links to the respective target document, and
   (C) a list of annotations corresponding to the respective target document, wherein a respective annotation in the list of annotations includes a text passage extracted from a respective source document of the set of source documents that is determined from text of the respective source document, and wherein the text passage is within a predetermined distance of a respective outbound link, from among the one or more outbound links pointing to the respective target document, in the respective source document that points to the respective target document;
   processing at least a subset of the plurality of anchor records, including, for each anchor record in the subset of the plurality of anchor records, adding to a document index entries for terms in the list of annotations in the anchor record, wherein the entries correspond to the target document identified by the anchor record.

2. The system of claim 1, wherein a respective entry in the list of annotations for the respective anchor record in the anchor map includes a text passage and a list of attributes of the text passage.

3. The system of claim 1, further including:
   generating a layered set of sorted anchor maps, wherein each sorted map in the layered set of anchor maps is associated with a production time.

4. The system of claim 3, further including:
   generating a merged anchor map including a plurality of merged anchor map records, each merged anchor record corresponding to at least one anchor record from the set of sorted anchor maps, wherein the merged anchor records are ordered in the merged anchor map based on their respective target document identifiers.

5. The system of claim 3, wherein at least one record in at least one sorted anchor map in the layered set of anchor maps contains a delete entry.

6. The system of claim 1, further including:
   generating a sorted link map, the sorted link map comprising a plurality of link map records, each link map record comprising a respective source document identifier and a respective list of target document identifiers, wherein the link map records are ordered in the sorted link map based on respective source document identifiers.

7. The system of claim 6, further comprising:
   determining, based at least in part on the sorted link map, a query-independent relevance metric for a document at a source document address corresponding to a source document identifier.

8. The system of claim 7, wherein the query-independent relevance metric is a page rank.

9. The system of claim 6, further including:
generating a layered set of sorted link maps, wherein each sorted link map in the layered set of sorted link maps is associated with a production time; and
generating a merged link map including a plurality of merged link map records, each merged link record corresponding to at least one link map record from a subset of the layered set of sorted link maps, wherein the merged link records are ordered in the merged link map based on respective source document identifiers.

10. A non-transitory computer readable storage medium storing one or more programs, for processing information about documents in a collection of linked documents, for execution by a computer system, the one or more programs comprising instructions for:
crawling at least a subset of the documents in the collection of linked documents;
extracting, from the crawled subset of the documents in the collection of linked documents, information concerning a plurality of outbound links between documents in the collection of linked documents;
generating an anchor map based on the information extracted from the collection of linked documents that concerns the plurality of outbound links between documents in the collection of linked documents, wherein the anchor map comprises a plurality of anchor records, and wherein a respective anchor record of the plurality of anchor records identifies:
(A) a respective target document, wherein the respective target document is pointed to by one or more outbound links among the plurality of outbound links,
(B) a list of inbound links identifying a set of source documents in the collection of linked documents that contain the one or more outbound links to the respective target document, and
(C) a list of annotations corresponding to the respective target document, wherein a respective annotation in the list of annotations includes a text passage extracted from a respective source document of the set of source documents that is determined from text of the respective source document, and wherein the text passage is within a predetermined distance of a respective outbound link, from among the one or more outbound links pointing to the respective target document, in the respective source document that points to the respective target document; and
processing at least a subset of the plurality of anchor records, including, for each anchor record in the subset of the plurality of anchor records, adding to a document index entries for terms in the list of annotations in the anchor record, wherein the entries correspond to the target document identified by the anchor record.

11. The non-transitory computer readable storage medium of claim 10, wherein a respective entry in the list of annotations for the respective anchor record in the anchor maps includes a text passage and a list of attributes of the text passage.

12. The non-transitory computer readable storage medium of claim 10, further including:
generating a layered set of sorted anchor map data structures, wherein each sorted map in the layered set of anchor maps stores a respective production time.

13. The non-transitory computer readable storage medium of claim 12, further including:
generating a merged anchor map including a plurality of merged anchor map records, each merged anchor record corresponding to at least one anchor record from the layered set of sorted anchor map data structures, wherein the merged anchor records are ordered in the merged anchor map based on respective target document identifiers.

14. The non-transitory computer readable storage medium of claim 12, wherein at least one record in at least one sorted anchor map in the layered set of anchor maps contains a delete entry.

15. The non-transitory computer readable storage medium of claim 10, further including
generating a sorted link map data structure, the sorted link map data structures comprising a plurality of link map records, each link map record comprising a respective source document identifier and a respective list of target document identifiers, wherein the link map records are ordered in the sorted link map based on their respective source document identifiers.

16. The non-transitory computer readable storage medium of claim 15, further comprising:
determining, based at least in part on the sorted link map, a query-independent relevance metric for a document corresponding to a source document identifier.

17. The non-transitory computer readable storage medium of claim 16, wherein the query-independent relevance metric is a page rank.

18. The non-transitory computer readable storage medium of claim 10, further including:
generating a layered set of sorted link maps, wherein each sorted map link in the layered set of sorted link maps stores a respective production time; and
generating a merged link map including a plurality of merged link map records, each merged link record corresponding to at least one anchor record from a subset of the layered set of sorted link map, wherein the merged link records are ordered in the merged link map based on respective source document identifiers.

19. A method of processing information about documents in a collection of linked documents, the method comprising:
at a computer system with one or more processors and memory:
crawling at least a subset of the documents in the collection of linked documents;
extracting, from the crawled subset of the documents in the collection of linked documents, information concerning a plurality of outbound links between documents in the collection of linked documents;
generating an anchor map based on the information extracted from the collection of linked documents that concerns the plurality of outbound links between documents in the collection of linked documents, wherein the anchor map comprises a plurality of anchor records, and wherein a respective anchor record of the plurality of anchor records identifies:
(A) a respective target document, wherein the respective target document is pointed to by one or more outbound links among the plurality of outbound links,
(B) a list of inbound links identifying a set of source documents in the collection of linked documents that contain the one or more outbound links to the respective target document, and
(C) a list of annotations corresponding to the respective target document, wherein a respective annotation in the list of annotations includes a text passage extracted from a respective source document of the set of source documents that is determined from text of the respective source document, and wherein the text passage is within a predetermined distance of a respective outbound link, from among the one or more outbound links pointing to the respective target document, in the respective source document that points to the respective target document; and processing at least a subset of the plurality of anchor records, including, for each anchor record in the subset of the plurality of anchor records, adding to a document index entries for terms in the list of annotations in the anchor record, wherein the entries correspond to the target document identified by the anchor record.

20. The method of claim 19, wherein a respective entry in the list of annotations for the respective anchor record in the anchor map includes a text passage and a list of attributes of the text passage.

21. The method of claim 19, further including:
generating a layered set of sorted anchor maps, wherein each sorted map in the layered set of anchor maps is associated with a production time.

22. The method of claim 21, further including:
generating a merged anchor map including a plurality of merged anchor map records, each merged anchor record corresponding to at least one anchor record from the set of sorted anchor maps, wherein the merged anchor records are ordered in the merged anchor map based on their respective target document identifiers.

23. The method of claim 21, wherein at least one record in at least one sorted anchor map in the layered set of anchor maps contains a delete entry.

24. The method of claim 19, further including:
generating a sorted link map, the sorted link map comprising a plurality of link map records, each link map record comprising a respective source document identifier and a respective list of target document identifiers, wherein the link map records are ordered in the sorted link map based on respective source document identifiers.

25. The method of claim 24, further comprising:
determining, based at least in part on the sorted link map, a page rank for a document corresponding to a source document identifier.

26. The method of claim 19, further including:
generating a layered set of sorted link maps, wherein each sorted link map in the layered set of sorted link maps is associated with a production time; and
generating a merged link map including a plurality of merged link map records, each merged link record corresponding to at least one link map record from a subset of the layered set of sorted link maps, wherein the merged link records are ordered in the merged link map based on respective source document identifiers.

* * * * *